United States Patent [19]

Douglas et al.

[11] 4,113,117
[45] Sep. 12, 1978

[54] ARTICLE HANDLING APPARATUS

[76] Inventors: Waymon Joe Douglas, 2905 Nakomi Dr., Lexington, Ky. 40503; Wilburn Cleatus Douglas, Rte. 5, Nicholasville, Ky. 40356

[21] Appl. No.: 743,787

[22] Filed: Nov. 22, 1976

[51] Int. Cl.² .................................................. B65G 15/26
[52] U.S. Cl. ............................... 214/8.5 C; 198/812; 212/145; 271/12; 214/1 H; 214/1 QD; 214/83.26; 214/518
[58] Field of Search ............... 214/8.5 D, 1 S, 1 SW, 214/1 H, 518, 89, 91 R, 8.5 C, 83.26, 1 QD; 198/812; 212/145, 1 H, 1 S, 1 SW, 8.5 C, 8.5 D, 89, 91 R, 83.26, 518; 271/9, 10, 11, 12, 107

[56] References Cited

U.S. PATENT DOCUMENTS

| | | | |
|---|---|---|---|
| 2,590,222 | 3/1952 | Veen | 271/11 X |
| 3,144,138 | 8/1964 | Brown | 212/145 |
| 3,146,902 | 9/1964 | Voelker | 214/8.5 D X |
| 3,656,634 | 4/1972 | Pearne | 214/8.5 C X |
| 3,825,107 | 7/1974 | Cary | 198/812 X |

FOREIGN PATENT DOCUMENTS 1,414,899 11/1975 United Kingdom .................. 271/9

Primary Examiner—Robert G. Sheridan
Assistant Examiner—George F. Abraham
Attorney, Agent, or Firm—Frank C. Leach, Jr.

[57] ABSTRACT

Drywall boards are lifted from the bed of a truck to an extensible conveyor, which is supported by the bed of the truck, for transport from the truck to a building under construction. The drywall boards are disposed in two stacks on the truck bed with the conveyor being disposed along the longitudinal central axis of the truck bed so that a board from each stack is automatically disposed on the conveyor in sequence.

21 Claims, 31 Drawing Figures

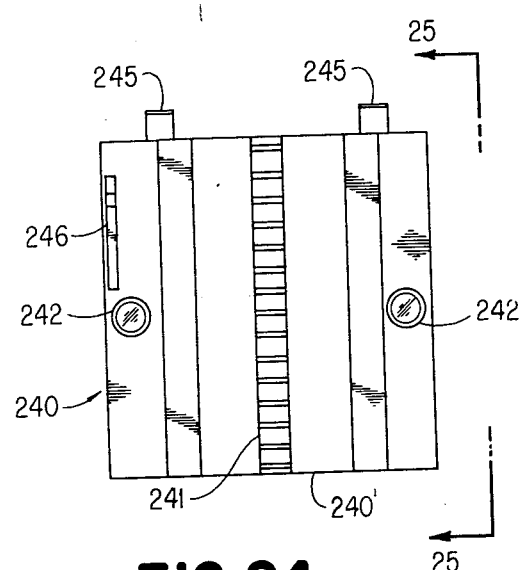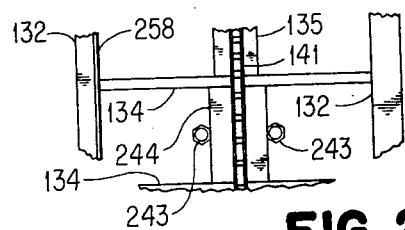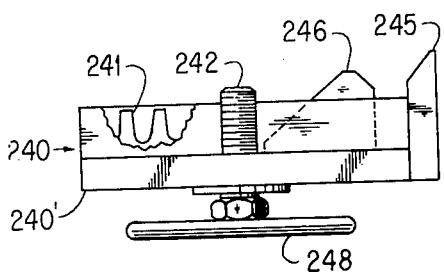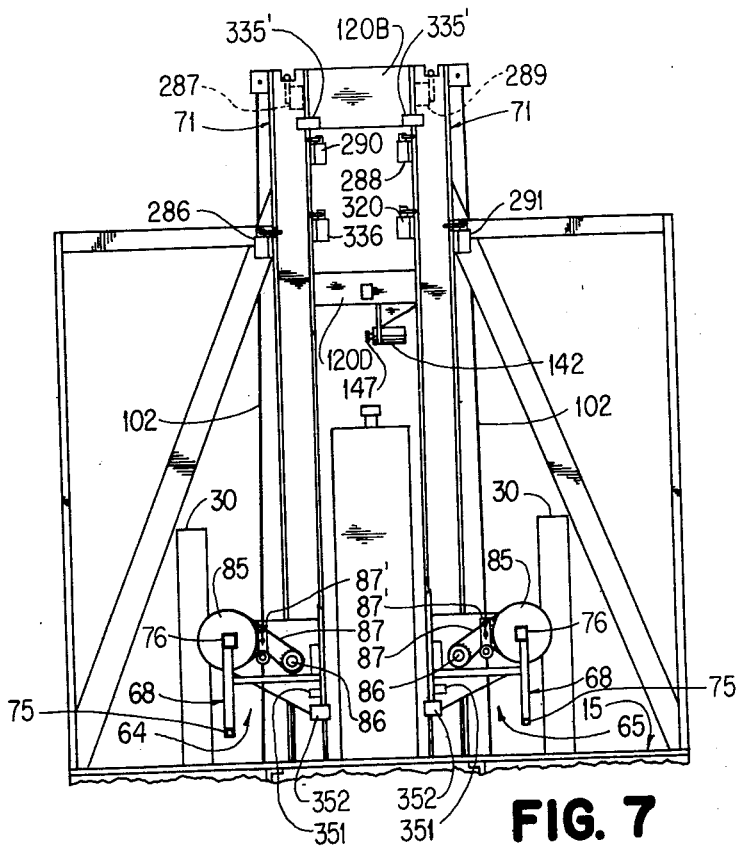

ARTICLE HANDLING APPARATUS

In constructing a building such as a house, for example, drywall boards are not delivered to the construction site until the framing of the building has been erected. Otherwise, the drywall boards can be damaged or stolen if stored for any period of time at the construction site. Therefore, it is desired that the drywall boards be delivered at approximately the time they will be utilized by being secured to the framing of the building.

At this stage of construction, plumbing ditches, for example, may have already been formed in the ground. These function to prevent a truck, which has the drywall boards thereon, from being driven close to the building under construction. As a result, it is necessary for the drywall boards to be lifted off the bed of the truck and manually carried into the building. Since a drywall board weighs two pounds per square foot, a drywall board of four feet by twelve feet weights ninety-six pounds. Thus, this is a relatively heavy weight and requires two persons to handle because of its size. Furthermore, there is always the possibility of a handler falling into the ditch and being injured.

There also may be stacks of bricks, for example, stored at the construction site and so located as to prevent the truck with the drywall boards thereon from being backed up to the house even if there are no plumbing ditches in the ground, for example. Furthermore, even if there are no obstacles such as the plumbing ditches or the bricks, for example, most construction sites do not have grass so that mud is prevalent when it rains and until the ground drys. As a result, a truck with the drywall boards cannot be backed up when the ground is muddy as the truck can become stuck in the mud. Again, this requires manual unloading of the drywall boards on the street and manually carrying them into the building under construction.

If the building is a house with two stories, for example, it is necessary to have a significant portion of the drywall boards taken to the second floor. With an L-shaped stairway, for example, it is not possible to get drywall boards having a length of twelve feet, for example, to the second floor so that a shorter drywall board must be employed if the drywall boards are manually carried to the second floor. The use of the shorter drywall boards increases the time for both handling the drywall boards since there are more of them and increases the cost of erecting the drywall boards on the framing because of more drywall boards being required.

One previous means of lifting drywall boards to a second floor has been to utilize a cherry picker in which the drywall boards are disposed in the cherry picker for lifting to the second floor. However, this requires the truck to be right next to the house and the drywall boards must still be pulled through a window, for example. With the truck having to be next to the house, this requires that the ground not be muddy or that there not be obstacles such as plumbing ditches or stacks of bricks, for example.

Whenever a building has a third floor, a crane is utilized to transport the drywall boards from the truck bed to the third floor. Of course, the drywall boards could be manually carried to the third floor if the shape of the stairway permitted such.

The article handling apparatus of the present invention satisfactorily overcomes the foregoing problems through providing an arrangement for enabling drywall boards to be transported from a truck bed to the first, second, or third floor of a building without the truck having to leave the street. Thus, muddy ground cannot prevent the article handling apparatus of the present invention from unloading drywall boards at a building under construction. Similarly, the obstacles of the plumbing ditches and the bricks, for example, do not present any problem.

Furthermore, the article handling apparatus of the present invention eliminates the difficulty of getting the drywall boards to other floors through having to use the stairs. The present invention automatically transports the drywall boards to the desired floor and to such an extent that it is not necessary for the person within the building to reach out to pull the drywall board into the building in the same manner as is necessary with the cherry picker, for example.

The article handling apparatus of the present invention accomplishes the foregoing through providing an extensible conveyor mounted in vertically spaced relation to a truck bed so that the conveyor can extend from the street to a building, which is usually about 40 feet from the street. The conveyor of the present invention is capable of transporting the drywall board into the building to an extent that it is not necessary for the person within the building to reach exterior thereof.

The article handling apparatus of the present invention utilizes an automatic lifting arrangement in which the drywall boards are automatically and quickly loaded onto the conveyor from the truck bed. Thus, no manual labor is required in moving the drywall board from the truck bed into the building under construction. The only manual labor is after the drywall board is taken from the extensible conveyor.

With the article handling apparatus of the present invention, eight drywall boards can be unloaded per minute into the building. With manual unloading from a truck bed, it takes about three minutes for each drywall board to be carried into the building.

The article handling apparatus of the present invention is capable of handling 50,000 to 70,000 square feet of drywall boards per day with the use of two persons. A flat bed truck with two persons can handle only twenty thousand square foot of drywall boards per day. With a cherry picker on a flat bed truck, three persons are required and approximately 35,000 square feet of drywall boards can be handled per day. Thus, the article handling apparatus of the present invention is capable of handling a much larger quantity of drywall board in the same period of time so as to significantly reduce the cost in comparison with the previously available devices.

An object of this invention is to provide an article handling apparatus for mechanically moving bulky articles to relatively inaccessible locations.

Another object of this invention is to provide an article handling apparatus for automatically transporting articles rapidly.

Other objects of this invention will be readily perceived from the following description, claims, and drawings.

The attached drawings illustrate a preferred embodiment of the invention, in which:

FIG. 7 is a schematic rear elevational view taken along line 7—7 of FIG. 1 and showing the front support structure for the article handling apparatus of the present invention with the conveyor omitted;

FIG. 24 is a top plan view of a chain lock used to hold the chain against movement when extending or retracting the second and third conveyor sections of the extensible conveyor;

FIG. 25 is a side elevational view of the chain lock of FIG. 24 and taken along line 25—25 of FIG. 24;

FIG. 26 is a fragmentary bottom plan view of the end of the third conveyor section and showing the arrangement for connecting the chain lock of FIGS. 24 and 25 thereto;

Figure 1:
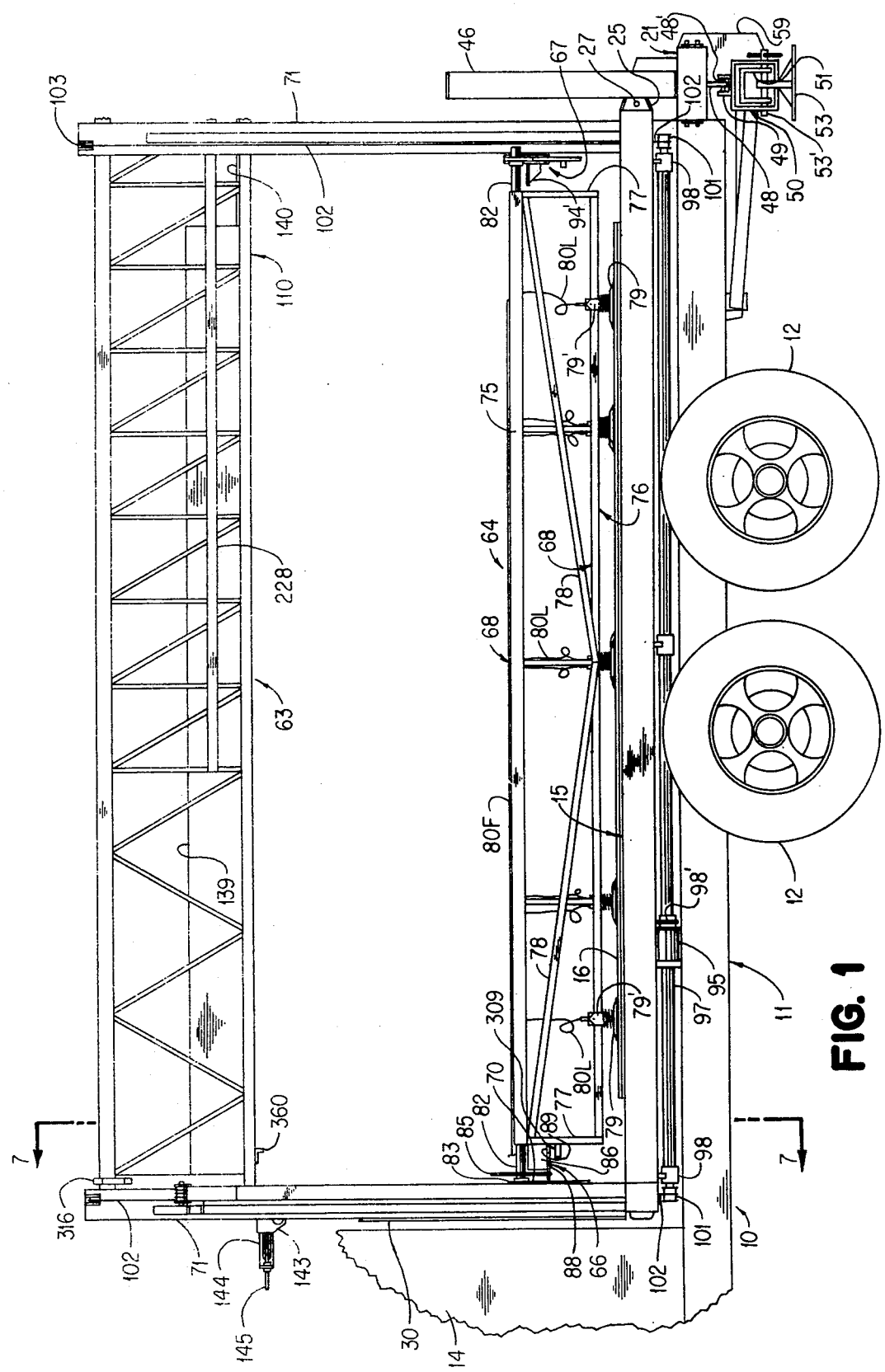
FIG. 1 is a side elevational view of a truck having the article handling apparatus of the present invention supported thereon with the conveyor extended.

Referring to the drawings and particularly FIG. 1, there is shown a truck 10 having a chassis or frame 11 mounted on wheels 12. The truck 10 includes a cab 14 supported on the chassis or frame 11.

The truck 10 has a bed 15 mounted on the chassis or frame 11 so that the bed 15 may pivot adjacent its rear end to raise the front end of the bed 15. Thus, the bed 15, which supports two stacks of drywall boards 16 in substantially horizontal positions, can be pivoted relative to the chassis or frame 11 of the truck 10 when such is necessary to maintain the bed 15 substantially horizontal as when the truck 10 is disposed on non-level ground, for example.

The bed 15 includes a support plate 17 (see FIG. 2) having tubing 18 extending around the periphery of the plate 17. Longitudinal runners 19, which are C-shaped and rest on top of the chassis or frame 11, extend between the tubing 18 at the front and rear ends of the bed 15. Cross braces 20, which ae C-shaped, extend between the tubing 18 on opposite sides of the bed 15 and above the runners 19. Thus, the plate 17 is supported by the tubing 18, the runners 19, and the cross braces 20.

The bed 15 is pivotally connected to the chassis or frame 11 through being pivotally connected to a U-shaped frame 21, which is fixed to the rear of the chassis or frame 11 by the ends of its legs, at two locations. Each of these two pivotal connections includes a pair of plates 25 (see FIGS. 5 and 6) welded to the tubing 18 at the rear of the bed 15 and a plate 26 welded to the frame 21. The plates 25 and the plate 26 are connected to each other by a pin 27, which extends through aligned openings in the plates 25 and the plate 26 and is retained therein by a cotter pin. Thus, the bed 15 pivots about the horizontal axis of the pins 27.

Figure 4:
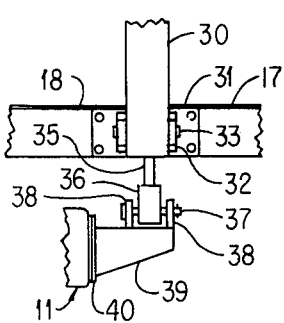
FIG. 4 is a fragmentary front elevational view of the truck bed and showing the connection of a hydraulic cylinder to the truck bed for enabling raising of the front end of the truck bed.

The bed 15 is pivoted about the axis of the pins 27 by supplying hydraulic fluid to a pair of hydraulic cylinders 30 (see FIG. 7), which are pivotally connected to the front end of the bed 15. The tubing 18 at the front of the bed 15 has a pair of plates 31 (see FIG. 4) secured thereto with each of the plates 31 cooperating with one of the cylinders 30. Each of the plates 31 has a pair of ears 32 extending therefrom and having a pivotal connection to the cylinder 30. The pivotal connection of the ears 32 to the cylinder 30 is through a shaft 33 projecting from each side of the cylinder 30.

Each of the cylinders 30 has its piston rod 35 extending downwardly therefrom and pivotally connected to the chassis or frame 11. The bottom end of the piston rod 35 has a clevis 36 secured thereto and pivotally connected by a pivot pin 37 to a pair of ears 38, which are secured between a pair of plates 39 extending from a plate 40 fixed to the chassis or frame 11.

Accordingly, when hydraulic pressure is supplied to the upper end of the cylinder 30, the cylinder 30 moves upwardly because the piston rod 35 is fixed against vertical movement since it is secured to the chassis or frame 11. This results in the bed 15 pivoting about the horizontal axis of the pins 27 to raise the front end of the bed 15 with respect to the back end of the bed 15. Thus, this would be utilized when the truck 10 was parked with its front end downhill so that the bed 15 could be moved to a substantially horizontal position by lifting the front end of the bed 15.

When the truck 10 is parked so that its rear end is lower than its front end whereby it is necessary to raise the rear end of the bed 15 relative to the front end of the bed 15 to have the bed 15 substantially horizontal, it is necessary to raise the entire chassis or frame 11 of the truck 10. The arrangement for raising the rear of the truck 10 includes a pair of hydraulic cylinders 46 (see FIG. 5) pivotally mounted on the U-shaped frame 21 for rotation about the axis of pivot pins 47. Each of the cylinders 46 has its piston rod 48 (see FIG. 1) pivotally connected by a pin 48' to a clevis 49 (see FIGS. 1 and 5) on a stabilizer 50.

Each of the stabilizers 50 is hollow and has a tubular member 51 extending therefrom and retained therein by a pin 52 extending through a first aligned pair of openings in the tubular member 51. The end of each of the tubular members 51 is U-shaped to have a foot 53, which is adapted to engage the ground, pivotally connected thereto by a pin 53' passing through a second pair of openings in the tubular member 51. The foot 53 is removably connected to the tubular member 51. When the foot 53 is not connected to the tubular member 51, the tubular member 51 is held in a retracted position within the stabilizer 50 by the pin 52 passing through the second pair of openings, which have the pin 53' extending through them when the foot 53 is connected to the tubular member 51, rather than the first pair of openings.

The stabilizers 50 are pivotally connected to the frame 21 through having a shaft 54 (see FIGS. 5 and 6) extend through aligned openings in a pair of ears 55 (see FIG. 6) on one of the stabilizers 50, aligned openings in a U-shaped bracket 56 on the other of the stabilizers 50, and through aligned openings in a pair of plates 57, which are secured to a surface of the frame 21 and a surface of the chassis or frame 11 of the truck 10 and extend downwardly therefrom. Braces 58 extend between the plates 57. A pair of additional braces 59 is disposed exterior of the frame 21.

Accordingly, when hydraulic fluid is supplied to the top of each of the cylinders 46, the piston rods 48 extend downwardly to cause the feet 53 to engage the ground. Thereafter, the cylinders 46 will move upwardly since the piston rods 48 cannot move downwardly because of the feet 53 engaging the ground whereby the truck chassis or frame 11 is lifted with respect to the front of the truck 10.

If the truck 10 is disposed so that the truck bed 15 is tilted to the side rather than to the front or the back, then one of the cylinders 46 and one of the cylinders 30 would be activated to move the truck bed 15 to a substantially horizontal position. Additionally, the bed 15 may be both tilted to one side and to the rear or front. This would necessitate selective activation of the cylinders 30 and 46 to cause the truck bed 15 to be moved to a substantially horizontal position.

The drywall boards 16 are arranged in two stacks with each of the stacks disposed on opposite sides of an extensible conveyor 63, (see FIG. 1) which is mounted in vertically spaced relation to the bed 15. Each of lifting mechanisms 64 and 65 (see FIG. 5) for raising the drywall boards 16 of the two stacks from the bed 15 and depositing them in the conveyor 63 is the same.

Each of the lifting mechanisms 64 and 65 includes a front lifting support 66 (see FIG. 6), a rear lifting support 67, and a suction rack 68. The rack 68 is connected to the lifting supports 66 and 67 for vertical movement therewith while being capable of rotating relative thereto.

Figure 2:
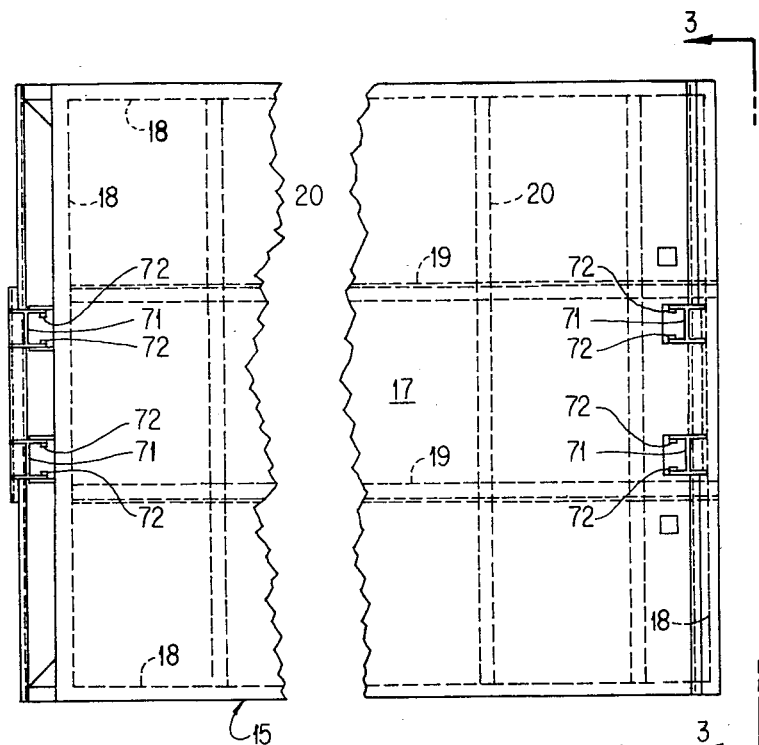
FIG. 2 is a top plan view of the truck bed of FIG. 1 and showing a portion of the supports of the article handling apparatus of the present invention supported thereby.
Figure 3:
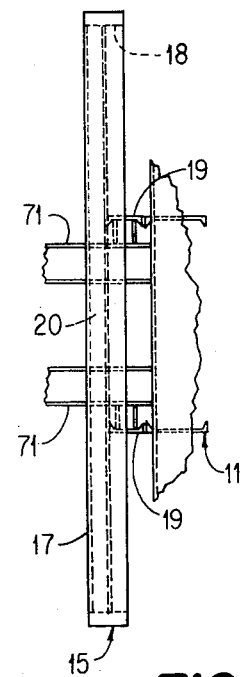
FIG. 3 is an end elevational view of the truck bed of FIG. 2 and taken along line 3—3 of FIG. 2.

Each of the front lifting supports 66 and the rear lifting supports 67 includes a longitudinal tubular member 69, which has a rectangular cross sectional shape and is closed at each end. Each of the front lifting supports 66 has an arm 70 (see FIGS. 10 and 11) extending from the tubular member 69 while each of the rear lifting supports 67 has an arm 70' (see FIGS. 12 and 13) extending from the tubular member 69. The tubular member 69 of each of the front lifting supports 66 and the rear lifting supports 67 rides in an H-beam 71 (see FIGS. 1, 2, 5, and 6), which extends upwardly from the bed 15. There are four of the vertically disposed H-beams 71 with two being at the front of the truck bed 15 and two being adjacent the rear of the truck bed 15 as shown in FIGS. 2 and 6.

Each of the H-beams 71 has rollers 72 mounted along the length of each of two opposite parallel surfaces thereof and against which a pair of flats 73 (see FIGS. 10 and 12) on the tubular member 69 bears. Thus, easy sliding of the tubular member 69 along the H-beam 71 is obtained through the rollers 72.

The rack 68 of each of the lifting mechanisms 64 and 65 includes an upper horizontal longitudinal member 75 (see FIG. 1), a lower horizontal longitudinal member 76, and vertical support members 77 extending therebetween and secured to the members 75 and 76. Flat braces 78 extend diagonally between the upper longitudinal member 75 and the lower longitudinal member 76 and are secured thereto. The braces 78 also are secured to the vertical members 77.

A plurality of suction cups 79, which are formed of a flexible material, is supported by the lower horizontal longitudinal member 76. Some of the suction cups 79 are disposed adjacent the lower horizontal longitudinal member 76 while others are spaced therefrom. All of the suction cups 79 except the suction cup 79 on each end of each of the racks 68 are fixed. The suction cup 79 on each end of each of the racks 68 is adjustably mounted through being mounted on the lower horizontal longitudinal member 76 by a clamp 79'.

Figure 8A:
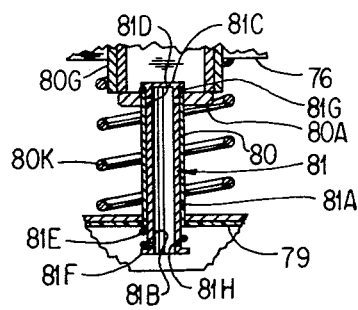
FIG. 8A is a fragmentary sectional view of the valve utilized with the vacuum cup of FIG. 8.
Figure 8:
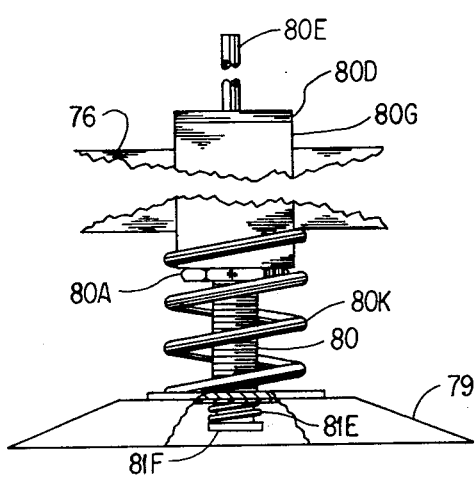
FIG. 8 is an elevational view, partly in section, of a vacuum cup of the article handling apparatus of the present invention.

As shown in FIG. 8, the suction cup 79 has a hollow threaded element 80 extending therefrom and threaded into a nut 80A, which is secured to the bottom of a slide adapter 80B (see FIG. 9) through being welded thereto to form an airtight connection therebetween. The slide adapter 80B is hollow and has its upper end closed by a plate 80C, which has an annular stop 80D secured thereto to form a shoulder. A hollow vacuum tube connector 80E extends upwardly from the plate 80C for connection to a vacuum tube 80F (see FIG. 1), which is supported on the upper horizontal longitudinal member 75 and connects a vacuum source (not shown) to the suction cup 79 through the connector 80E (see FIG. 9), the hollow slide adapter 80B, and a valve 81 (see FIG. 8A) in the hollow threaded element 80.

The valve 81 comprises a hollow cylindrical body 81A having a longitudinal passage 81B therein. The passage 81B is open at its lower end and closed at its upper end by a cap 81C. The upper end of the passage 81B communicates through a pair of diametrically disposed passages 81D with the exterior of the cylindrical body 81A.

Figure 9:
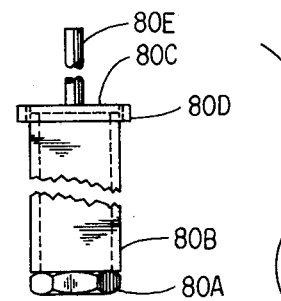
FIG. 9 is an exploded elevational view of a portion of the structure of FIG. 8.

The passages 81D are disposed within the threaded element 80 when the valve 81 is in its closed position (see FIG. 8A). The cylindrical body 81A is urged to this position by a spring 81E, which acts against a flange 81F at the lower end of the cylindrical body 81A. An O-ring 81G is carried by the cylindrical body 81A just below the cap 81C and abuts the top of the threaded element 80 when the valve 81 is held in its closed position by the spring 81E. This prevents the application of a vacuum to the passage 81B.

When the suction cup 79 is moved into engagement with one of the boards 16, the bottom end of the cylindrical body 81A is engaged by the board 16 so that continued downward movement overcomes the force of the spring 81E and allows the passages 81D to communicate with the interior of the hollow slide adapter 80B so that a vacuum may be applied to the interior of the suction cup 79 to hold the board 17 thereagainst. In addition to having the bottom end of the passage 81B open, the body 81A has a pair of diametrically disposed passages 81H communicating between the interior of the cup 79 and the passage 81B.

To prevent the suction cups 79 from adhering to the truck bed 15 when one of the boards 16 is not on the truck bed 15 and the suction cups 79 are moved into engagement with the truck bed 15, passages (not shown) extend through the truck bed 15. Thus, when the valve 81 is opened by engaging the truck bed 15 because of the absence of the drywall board 16, the passages in the truck bed 15 prevent the vacuum from causing the suction cup 79 to be held by the truck bed 15 when it is desired to raise the rack 68.

The slide adapter 80B is slidably disposed in a guide 80G, which is fixed to the lower horizontal longitudinal member 76 of the rack 68, either directly or through a connecting member 80H (see FIG. 5) when the suction cup 79 is spaced from the rack 68. A brace 80J extends from the guide 80G to the upper horizontal longitudinal member 75.

A spring 80K (see FIG. 8) acts against the top of the suction cup 79 to continuously urge the annular stop 80D against the top of the guide 80G. The spring 80K abuts the bottom surface of the lower longitudinal member 76.

Accordingly, each of the suction cups 79 is spring loaded. This enables compensation for any bowing of the drywall boards 16 because of the load imposed on the truck bed 15.

The two end suction cups 79 are adjustable in accordance with the length of the drywall boards 16. The longitudinal adjustment of these two suction cups 79 insures that various lengths of the drywall boards 16 can be readily lifted by the suction applied thereto.

The vacuum tube 80F is connected to each of the suction cups 79 by a flexible hose 80L (see FIG. 1). This flexibility of the hose 80L insures that the adjustable suction cups 79 can be readily moved along the lower horizontal longitudinal member 76 of the rack 68.

The rack 68 has a shaft 82 extending from each end of the upper horizontal longitudinal member 75. One of the shafts 82 is rotatably mounted in a sleeve 83 (see FIGS. 10 and 11) on the arm 70 of the front lifting support 66 and the other of the shafts 82 is rotatably mounted in a sleeve 83' on the arm 70' of the rear lifting support 67. Thus, the rack 68 is rotatable relative to the front lifting support 66 and the rear lifting support 67 about the axis of the shafts 82 while being carried thereby for vertical movement.

The forwardly extending shaft 82 of each of the racks 68 has a sprocket 85 (see FIG. 7) mounted thereon. The sprocket 85 is driven by a motor 86 through a chain 87. The motor 86 for each of the lifting mechanisms 64 and 65 is mounted on the front lifting support 66 of each of the lifting mechanisms 64 and 65. The arm 70 has a chain adjuster 87' theron to enable adjustment of the tightness of the chain 86.

The front lifting support 66 has a support channel 88 (see FIGS. 10 and 11) extending from the arm 79 to support the motor 86. The end of the channel 88 remote from the arm 70 has a horizontal tube 89 secured thereto with a vertical tube 90 secured to the horizontal tube 89.

Accordingly, activation of the motor 86 rotates the rack 68 relative to the front lifting support 66 and the rear lifting support 67. Thus, the drywall board 16, which is retained for movement with the rack 68 by the suction cups 79, can be rotated from a horizontal position to a vertical position for disposition within the extensible conveyor 63.

The vertical tube 90 functions as a mechanical stop for the suction rack 68 when it is rotated to the horizontal position in which the drywall board 16 is held in a vertical position for disposition within the conveyor 63. The horizontal tube 89 functions as a mechanical stop for the rack 68 when it is moved to a horizontal position in which the drywall board 16 is picked up from the stack.

Figure 12:
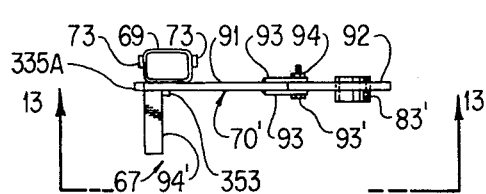
FIG. 12 is a top plan view of a rear lifting support of the lifting mechanisms of the article handling apparatus of the present invention.
Figure 13:
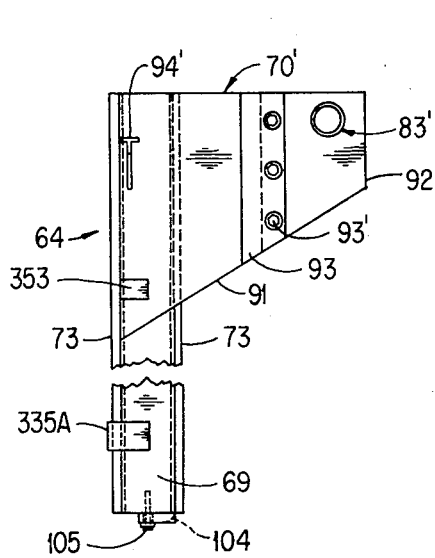
FIG. 13 is a front elevational view of the rear lifting support of FIG. 12 and taken along line 13—13 of FIG. 12.

As shown in FIGS. 12 and 13, the arm 70' of each of the rear lifting supports 67 comprises a pair of plates 91 and 92 with the sleeve 83' being mounted on the plate 92. The plates 91 and 92 are secured to each other by plates 93, which are welded to the plate 91, bolts 93' extending through the plate 92 and the plates 93, and nuts 94. This enables the rack 68 to be disconnected from the supports 66 and 67 since the arm 70 of the front lifting support 66 is a single plate having the sleeve 83.

The plate 91 of the arm 70' has a T-shaped element 94' mounted thereon. The element 94' function as a mechanical stop for the suction rack 68 when it is rotated to the horizontal position in which the drywall board 16 is held in the vertical position for disposition within the conveyor 63.

Figure 5:
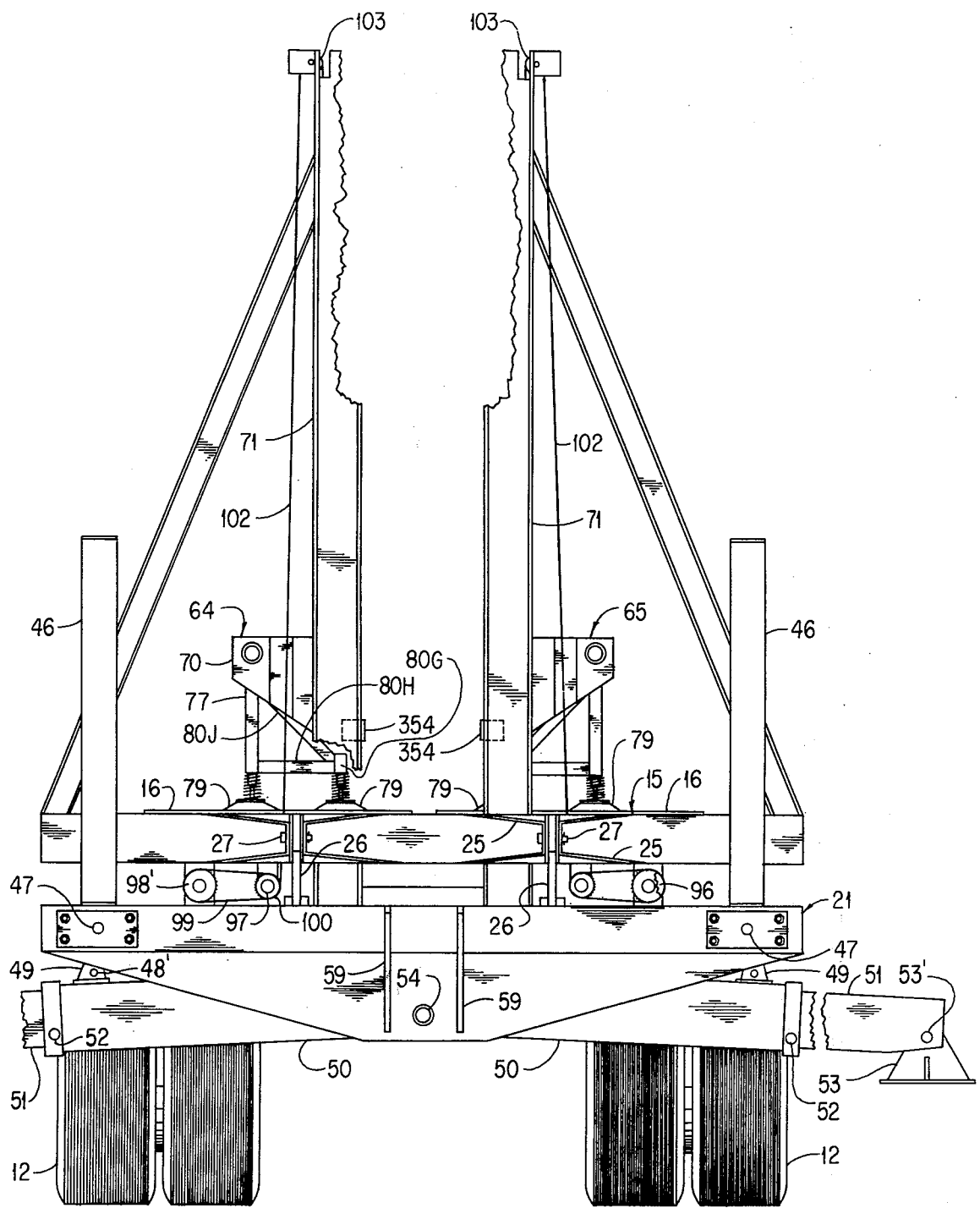
FIG. 5 is a rear elevational view of the truck of FIG. 1 with the conveyor omitted.
Figure 6:
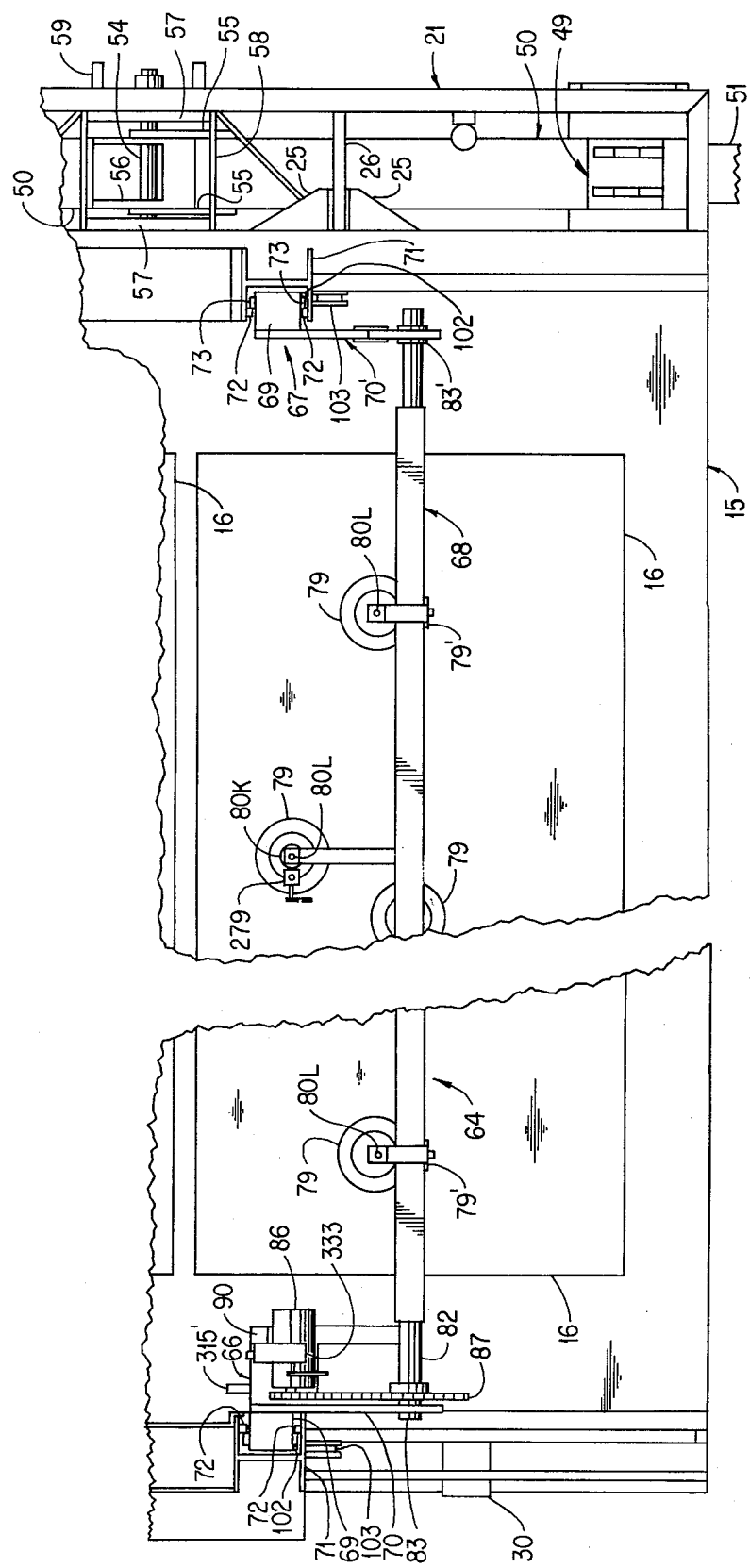
FIG. 6 is a fragmentary top plan view of a portion of the article handling apparatus of the present invention and disposed on the truck bed of FIG. 1.

The lifting mechanism 64 is moved vertically along two of the H-beams 71, which are disposed at the front and rear of the bed 15 on one side of the longitudinal axis, by a hydraulic motor 95 (see FIG. 1), and the lifting mechanism 65 is moved vertically along the other two H-beams 71, which are disposed at the front and adjacent the rear of the bed 15 on other side of the longitudinal axis, by a hydraulic motor 96 (see FIG. 5). The connection of the motors 95 and 96 to the lifting mechanisms 64 and 65 are the same so that only the arrangement for the lifting mechanism 64 will be described.

The motor 95 is supported by the bed 15 of the truck 10 and is disposed therebeneath. The motor 95 drives a shaft 97 (see FIG. 1), which is rotatably supported by bearings 98 from the bottom of the bed 15. The motor 95 has a chain sprocket 98' on its shaft to receive a chain 99 (see FIG. 5), which cooperates with a chain sprocket 100 on the shaft 97. Thus, the direction of rotation of the motor 95 is transmitted to the shaft 97 through the chain 99.

The shaft 97 has a pulley 101 (see FIG. 1) at each end. A cable 102 is wrapped around the pulley 101 to be unwound therefrom or be wound thereon.

Each of the cables 102 passes around a pulley 103, which is supported by brackets at the upper end of the H-beam 71, and then is secured to the front lifting support 66 or the rear lifting support 67 of the lifting mechanism 64. Each of the cables 102 has its end secured to the bottom of the tubular member 69 by being held between a plate 104 (see FIGS. 11 and 13) and the head of a bolt 105, which secures the pate 104 to the tubular member 69.

The extensible conveyor 63 includes a first conveyor section 110 (see FIGS. 14 and 15), which is supported by the H-beams 71 at the front and rear of the truck bed 15, a second conveyor section 111 (see FIGS. 14 and 16), which is supported by the first conveyor section 110 and slidable relative thereto, and a third conveyor section 112 (see FIGS. 14 and 17), which is supported by the second conveyor section 111 and is slidable relative to the first conveyor section 110 and the second conveyor section 111. Thus, the conveyor sections 110–112 can be in a nested arrangement when the truck 10 is being driven to the construction site and extended as necessary when unloading the drywall boards 16.

The first conveyor section 110 includes a pair of substantially parallel upper channels 113 spaced from each other, a lower channel 114, and posts 115 and braces 115' extending between each of the upper channels 113 and the lower channels 114. The posts 115 are disposed at each end of the channels 113 and 114.

Each of the upper channels 113 is secured adjacent its rear end to one of the H-beams 71 adjacent the rear end of the truck bed 15. Each of the upper channels 113 is secured to the H-beam 71 through a spacer 116 (see FIG. 14) welded to the upper channel 113, an L-shaped mounting bracket 117 welded to the spacer 116, and an L-shaped mounting bracket 118, which is secured to the H-beam 71 by bolts 119 and to the bracket 117 by bolts 120.

Each of the upper channels 113 is secured at its front end to one of the H-beams 71 adjacent the front end of the truck bed 15. Each of the channels 113 is secured to the H-beam 71 through a plate 120A (see FIG. 15), which is welded to the upper channel 113 and the adjacent front post 115, and an L-shaped channel 120B (see FIG. 7), which extends between the two H-beams 71 adjacent the front end of the truck bed 15. A bolt (not shown) secures each of the plates 120A to the channel 120B.

Figure 18:
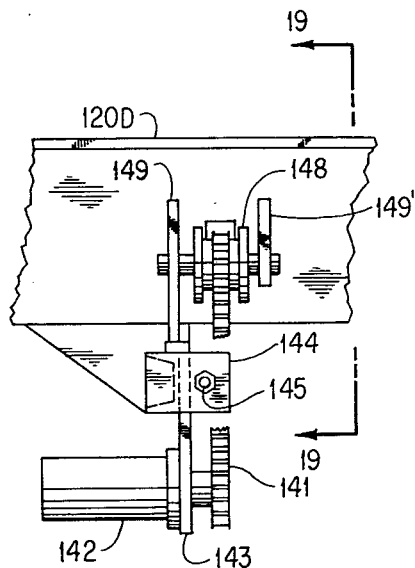
FIG. 18 is a fragmentary front elevational view of a chain drive for advancing articles along the conveyor.
Figure 19:
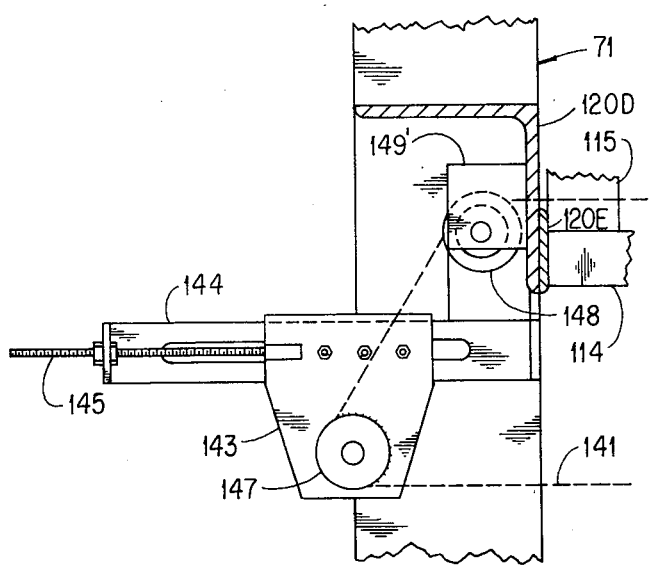
FIG. 19 is a fragmentary elevational view, partly in section, of the chain drive of FIG. 18 and taken along line 19—19 of FIG. 18.

The lower channel 114 is secured at its front end to an L-shaped channel 120D (see FIGS. 18 and 19), which extends between the two H-beams 71 adjacent the front end of the truck bed 15. The lower channel 114 is secured to the L-shaped channel 120D through a plate 120E (see FIGS. 15 and 19), which is welded to the lower channel 114 and the front adjacent post 115, and a bolt (not shown).

The second conveyor section 111 includes a pair of substantially parallel upper channels 121 (see FIGS. 14 and 16), a pair of substantially parallel lower channels 122, and post 123 and braces 123' extending between each of the upper channels 121 and the lower channels 122 vertically aligned therewith. The vertical posts 123 are disposed at each end of the channels 121 and 122. The lower channels 122 are secured to each other by a plurality of horizontally spaced plates 124, which have a horizontal longitudinal plate 125 extending thereover to join the plates 124 to each other.

Each of the upper channels 121 of the second conveyor section 111 has a pair of arms 126 attached thereto closer to its front end through spacers 127 (see FIG. 14), which are mounted on the inner surfaces of the upper channels 121, so that each of the arms 126 is spaced from the inner side of the upper channel 121. A roller 128 is mounted on the upper end of each of the arms 126 for rolling along the upper surface of the adjacent upper channel 113 of the first conveyor section 110. A stop 128' (see FIG. 15) on each of the upper channels 113 engages one of the rollers 128 to limit extension of the second conveyor section 111.

Figure 14:
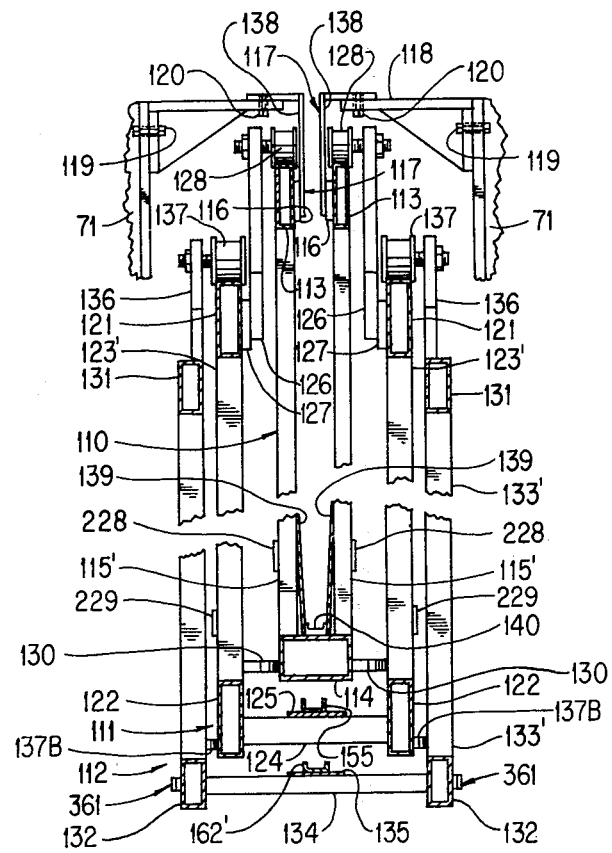
FIG. 14 is a fragmentary sectional view, partly in elevation, taken along line 14—14 of FIGS. 15-17 with some parts omitted for clarity purposes and showing the relationship of the conveyor sections when retracted.
Figure 15:
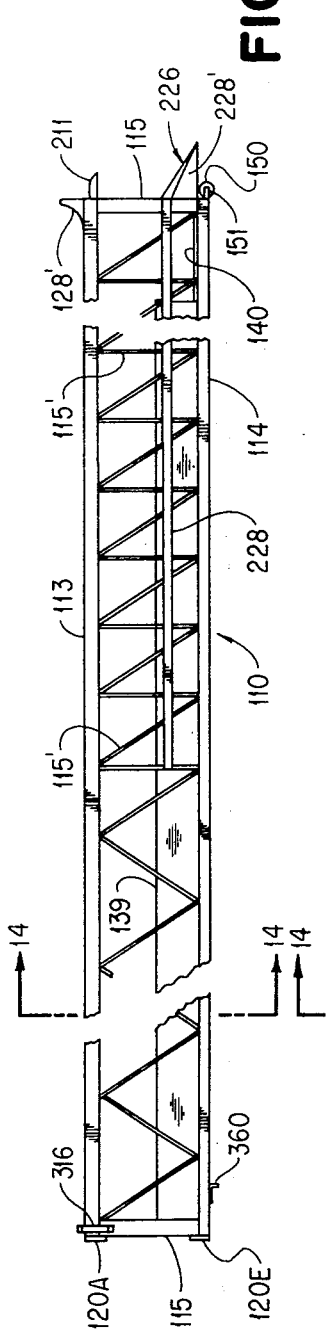
FIG. 15 is a fragmentary side elevational view of a first or front conveyor section of the extensible conveyor of the article handling apparatus of the present invention.

The second conveyor section 111 has a roller 129 rotatably mounted at its front end. The roller 129 is rotatably mounted between brackets 129', which are secured to the lower channels 122 and the posts 123 secured to the lower channels 122. The roller 129 rides along the bottom surface of the lower channel 114 of the first conveyor section 110 and has a flange on each end for engaging the side surfaces of the lower channel 14. As shown in FIG. 14, the rollers 128 have similar flanges for engaging the side surfaces of the upper channel 113 of the first conveyor section 110. Thus, the second conveyor section 111 slidably moves relative to the first conveyor section 110.

The second conveyor section 111 also has a side roller 130 mounted on each side thereof for engagement with the outer side surface of the lower channel 114 of the first conveyor section 110. This prevents any sidewise motion of the second conveyor section 111 as it slidably moves relative to the first conveyor section 110 by the four rollers 128 cooperating with the upper channels 113 of the first conveyor section 110 and the roller 129 cooperating with the lower channel 114 of the first conveyor section 110.

The third conveyor section 112 is constructed in a manner similar to the second conveyor section 111. The third conveyor section 112 includes a pair of substantially parallel upper channel 131, a pair of substantially parallel lower channels 132, and posts 133 and braces 133' extending between each of the upper channels 131 and the lower channels 132. The posts 133 are disposed at each end of the channels 131 and 132. A plurality of horizontally spaced plates 134 extends between the lower channels 132 and is secured thereto. A longitudinal plate 135 extends over the upper surface of each of the plates 134 and is secured thereto.

Each of the upper channels 131 of the third conveyor section 112 has a bracket 136 extending from its upper surface adjacent the front end thereof. A roller 137 is mounted on the upper end of each of the brackets 136 for rolling along the upper surface of the adjacent upper channel 121 of the second conveyor section 111. A stop 136' (see FIG. 16) on each of the upper channels 121 engages the roller 137 (see FIG. 14) to limit extension of the third conveyor section 112.

The third conveyor section 112 also has a pair of rollers 137A (see FIG. 17) rotatably mounted on opposite sides of its front end. Each of the rollers 137A is rotatably mounted by a bracket 137', which is secured to one of the lower channels 132 and the post 133 secured to the lower channel 132. Each of the rollers 137A rides along the bottom surface of one of the lower channels 122 of the second conveyor section 111 and has a flange on each end for engaging the side surfaces of the lower channel 122 on which it rides.

The third conveyor section 112 also has a side roller 137B mounted on each side thereof for cooperation with the outer side surfaces of the lower channels 122 of the second conveyor section 111. The side rollers 137B function in the same manner as the side rollers 130 of the second conveyor section 111.

The L-shaped mounting brackets 117 for the first conveyor section 110 have their parallel legs 138 (see FIG. 14) spaced from each other a sufficient distance to receive the drywall board 16 therebetween. When the drywall board 16 falls after being released from being held by the suction cups 79, the drywall board 16 passes between a pair of longitudinal guides 139 (see FIG. 15), which are supported by the braces 115' on opposite sides of the first conveyor section 110. The guides 139 are disposed at an angle to form a V-shaped arrangement, when viewed from the end as shown in FIG. 14, to cause the drywall board 16 to be maintained in a vertical position as it passes therethrough. The guides 139 do not extend for the entire length of the first conveyor section 110 but terminate short thereof and just short of the H-beams 71 adjacent the rear of the truck bed 15. The first conveyor section 110 has a U-shaped channel 140 supported on the upper surface of the lower channel 14 and extending from slightly beyond the rear end of the longitudinal guides 139 towards the rear end of the first conveyor section 110.

A chain 141 (see FIGS. 18, 19, 26, and 28) rides in the U-shaped channel 140 (see FIG. 14) and also beneath the opening between the longitudinal guides 139 so that the drywall board 16 falls onto the chain 141, which is driven by a hydraulic motor 142 (see FIG. 18), when the drywall board 16 is released from being held by the suction cups 79. The U-shaped channel 140 has a strip of metal of less width than the U-shaped channel 140 therein to have the rollers of the chain 141 engage therewith so that the chain 141 rides on its rollers rather than its connecting links.

The motor 142 is carried by a bracket 143 (see FIGS. 18 and 19), which is slidably movable along a bracket 144 by a tension rod 145. The bracket 144 is secured to the L-shaped channel 120D, which extends between the two H-beams 71 at the front of the bed 15 of the truck 10. The chain 141 passes over a sprocket 147 on the shaft of the motor 142 and around a roller 148, which is supported by plates 149 and 149' on the channel 120D, and into the U-shaped channel 140 after passing beneath the bottom of the guides 139.

The first conveyor section 110 has a roller 150 (see FIG. 15) extending from the rear end of the lower channel 114. The roller 150 is supported by a pair of substantially parallel plates 151, which are secured to the rear end of the lower channel 114 of the first conveyor section 110.

After passing around the roller 150, the chain 141 passes around a roller 152 (see FIG. 28) of the second conveyor section 111. The roller 152 is rotatably mounted between the lower channels 122 of the second conveyor section 111 intermediate their ends and extends above the top of the plate 125 of the second conveyor section 111.

Figure 27:
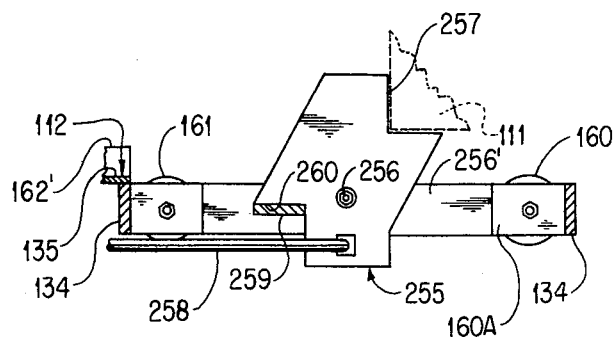
FIG. 27 is a fragmentary side elevational view, partly in section, of an arrangement for preventing relative movement between the second and third conveyor sections when they are fully extended and showing chain rollers for guiding the chain but with the chain omitted.
Figure 28:
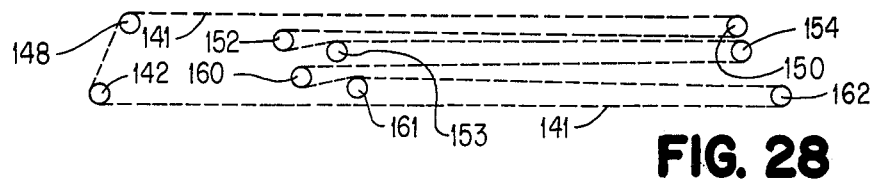
FIG. 28 is a schematic diagram showing the relationship of the chain to its drive motor and rollers on the conveyor sections.

After passing around the roller 152, the chain 141 passes over the top of a roller 153 (see FIG. 28), which also is carried by the second conveyor section 111. These two rollers 152 and 153 are substantially vertically aligned with the rollers 128 and supported in the same manner as rollers 160 and 161 (see FIG. 27) on the third conveyor section 112. Then the chain 141 passes around a roller 154 (see FIG. 16) on the rear end of the second conveyor section 111. The roller 154 is mounted beyond the rear end of the second conveyor section 111 in a manner similar to the roller 150 of the first conveyor section 110.

A U-shaped channel 155 (see FIG. 14) is supported on the upper surface of the plate 125 of the second conveyor section 111 to allow the chain 141 to ride therein in the same manner as the chain 141 rides in the U-shaped channel 140 on the first conveyor section 110. Thus, the U-shaped channel 155 has a strip of metal disposed therein to insure that the chain 141 is supported by its rollers rather than its connecting links as it moves through the U-shaped channel 155.

The chain 141 then passes around the roller 160, which is mounted adjacent the front end of the third conveyor section 112. The roller 160 is rotatably mounted between a pair of parallel plates 160A (see FIG. 27), which are parallel to the lower channels 132 of the third conveyor section 112 and disposed between two of the plates 134 to which they are secured. The roller 160 extends slightly above the top of the plate 135.

The chain 141 then passes over the top of the roller 161, which is rotatably mounted on the third conveyor section 112 between the parallel plates 160A. Then, the chain 141 passes around a roller 162 (see FIG. 17), which is mounted on the rear end of the third conveyor section 112 in the same manner as the roller 150 is mounted on the first conveyor section 110 and the roller 154 is mounted on the second conveyor section 111.

The third conveyor section 112 has a U-shaped channel 162' (see FIG. 14), which is the same as the U-shaped channels 140 and 155. The U-shaped channel 162' has a strip of metal therein to insure that the chain 141 rides on its rollers rather than its connecting links. The U-shaped channel 162' is supported on the upper surface of the plate 135.

After leaving the roller 162 and prior to returning to the sprocket 147, the chain 141 passes through a U-shaped guide 163' (see FIG. 17), which is supported on the front end of the third conveyor section 112, and a U-shaped guide 163' (see FIG. 16), which is supported on the front end of the second conveyor section 111. Each of the guides 163 and 163' has the ends of each of its sides formed with slight curves to prevent jamming of the chain 141. Similarly, each of the guides 163 and 163' has the ends of its bottom formed on an angle to enable the chain 141 to easily pass through each of the guides 163 and 163'.

When the drywall board 16 is released from the lifting mechanism 64 or 65, the drywall board 16 rides on the rollers of the chain 141 and does not engage any horizontal portion of the conveyor sections 110, 111, and 112. The sides of the U-shaped channels 140, 155, and 162' insure that the drywall board 16 remains on the chain 141.

Since the drywall board 16 is thinner than the spacing between the legs 138 (see FIG. 14) of the L-shaped bracket 117 of the first conveyor section 110, the second conveyor section 111 is disposed outside of the first conveyor section 110, and the third conveyor section 112 is disposed outside of the second conveyor section 111, the drywall board 16 would tend to tilt slightly from the vertical as it is advanced along the conveyor sections 110-112 with the tilting increasing as the drywall board 16 advances along the conveyor 63. To avoid this, the longitudinal guides 139 of the first conveyor section 110 aid in maintaining the drywall board 16 substantially vertical.

The second conveyor section 111 has upper guide means 190 (see FIG. 16) and lower guide means 191 to prevent the drywall boards 16 from tilting as each is advanced by the chain 141. The third conveyor section 112 has upper guide means 192 (see FIG. 17) and lower guide means 193 to prevent the drywall boards 16 from tilting as each is advanced by the chain 141.

The upper guide means 192 and the lower guide means 193 are mounted on the third conveyor section 112 so that they can be moved exterior of the second conveyor section 111 when the third conveyor section 112 is retracted over the second conveyor section 111. Similarly, the upper guide means 190 and the lower guide means 191 are mounted on the second conveyor section 111 so that they can be moved exterior of the first conveyor section 110 when the second conveyor section 111 is retracted over the first conveyor section 110.

Figure 23:
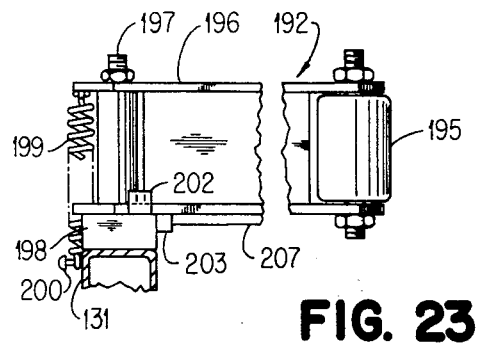
FIG. 23 is a sectional view, partly in elevation, of the guide of FIG. 22 and taken along line 23—23 of FIG. 22.
Figure 22:
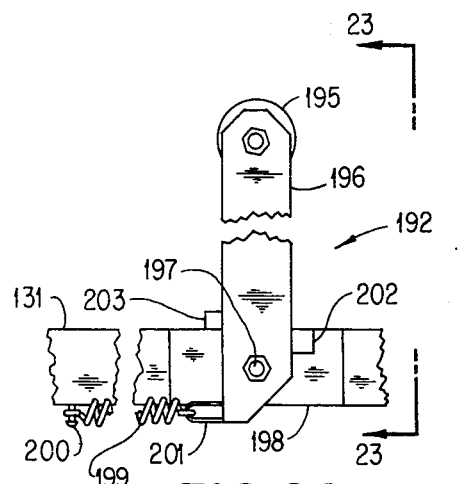
FIG. 22 is a top plan view of an upper guide on the third conveyor section for guiding the article during its movement along the third conveyor section.

As shown in FIGS. 22 and 23, the upper guide means 192 on the third conveyor section 112 includes a roller 195, which is carried by an arm 196 pivotally mounted on a bolt 197. The bolt 197 extends into a support block 198, which is secured to the upper surface of the upper channel 131 of the third conveyor section 112, and is connected thereto.

A spring 199, which has one end secured to the outer surface of the upper channel 131 of the third conveyor section 112 by a pin 200 and its other end connected by a hook 201 to the arm 196, continuously urges the arm 196 to the position of FIG. 22 in which the roller 195 can engage the drywall board 16 during its movement from right to left (as viewed in FIG. 22) along the second conveyor section 111 by the chain 141. The movement of the arm 196 by the spring 199 is limited by a stop 202, which is carried by the support block 198, being engaged by the arm 196. The arm 196 has a stop 203 mounted thereon for engagement with the support block 198 to limit any movement of the arm 196 by the board 16.

When the third conveyor section 112 is retracted to overlie the second conveyor section 111, it is necessary for each of the arms 196 to be moved so as to not engage the posts 123 and the braces 123' of the second conveyor section 111. Accordingly, cam means 205 (see FIG. 16) is mounted on an extension 204 at the rear end of each of the upper channels 121 of the second conveyor section 111 to move the arm 196 of each of the upper guide means 192 from its extended position to a position in which it does not engage the posts 123 and the braces 123' of the second conveyor section 111. The cam means 205 includes an inclined surface 206 to lift the arm 196 upwardly against the force of the spring 199, which urges the arm 196 downwardly, until the stop 203 on the arm 196 clears the top of the support block 198. The surface 206 of the cam means 205 engages a plate 207 on the bottom surface of the arm 196 to produce this motion.

When the stop 203 on the arm 196 clears the top of the suppot block 198, the roller 195 rolls along a surface of the extension 204 so that the arm 196 is rotated (counterclockwise as viewed in FIG. 22) against the force of the spring 199 to move the roller 195 into engagement with the outer surface of one of the upper channels 121 of the second conveyor section 111.

Thus, each of the upper guide means 192 on each side of the third conveyor section 112 has the arm 196 automatically retracted exterior of the posts 123 and the braces 123' on the same side of the second conveyor section 111 so as to not interfere with retraction of the third conveyor section 112 over the second conveyor section 111. When the third conveyor section 112 is extended relative to the second conveyor section 111, the arms 196 automatically return to their effective positions because of the cam means 205 and the spring 199.

The upper guide means 190 of the second conveyor section 111 is constructed similarly to the upper guide means 192 on the third conveyor section 112. The primary difference is that the arm 196 must be shorter because of the upper channels 121 being spaced closer to each other than the upper channels 131.

Additionally, the upper guide means 190 of the second conveyor section 111 has the spring 199 attached to its support block rather than to the upper channel 121. This is necessary because of the third conveyor section 112 telescoping over the second conveyor section 111.

The first conveyor section 110 has cam means 121 (see FIG. 15), which is mounted at the rear end of each of the upper channels 113, with a different configuration than the cam means 205. However, the same lifting and rotation of the arm 196 is accomplished by the cam means 211.

Figure 20:
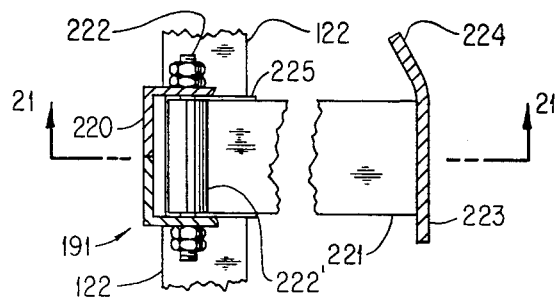
FIG. 20 is a fragmentary top plan view of a lower guide for the second conveyor section for guiding the articles along the second conveyor section.
Figure 21:
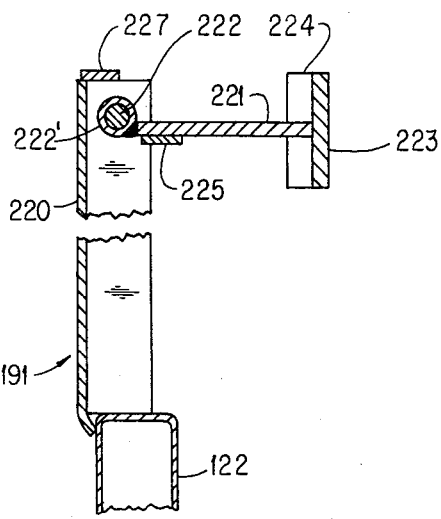
FIG. 21 is a fragmentary sectional view, partly in elevation, of the guide of FIG. 20 and taken along line 21—21 of FIG. 20.
Figure 4A:
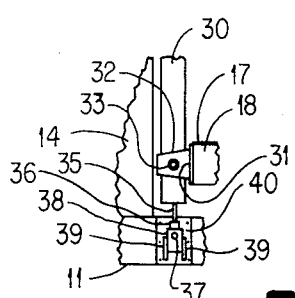
FIG. 4A is a fragmentary side elevational view of the connecting structure of FIG. 4.

As shown in FIGS. 20 and 21, the lower guide means 191 on the second conveyor section 111 includes a channel 220, which is secured to the top surface of the lower channel 122 of the second conveyor section 111. An arm 221 is pivotally mounted on a bolt 222, which extends between the sides of the channel 220, by a sleeve 222' fixed to one end of the arm 221.

The arm 221 has a guide 223 on the other end for cooperating with the drywall board 16 as it is advanced along the second conveyor section 111 by the chain 141. The guide 223 has an entering angled portion 224 to aid the drywall board 16 in moving between the two guides 223 on opposite sides of the drywall board 16. It should be understood that the lower guide means 191 are mounted directly opposite each other throughout the length of the second conveyor section 111.

The arm 221 is urged to its effective position against a horizontal stop 225 by gravity. The stop 225 is secured to the channel 220.

When the second conveyor section 111 is retracted over the first conveyor section 110, cam means 226 (see FIG. 15) at the rear end of each side of the lower channel 114 of the first conveyor section 110 cooperates with the arm 221 to move the arm 221 from its horizontal effective position to a vertical position in which the arm 221 abuts a stop 227 (see FIG. 21), which is secured to the channel 220. When the cam means 226 moves the arm 223 to its vertical position, one of a pair of slides 228 (see FIGS. 14 and 15), which are longitudinally extending members mounted on the exterior of the braces 115' on each side of the first conveyor section 110, cooperates to hold the arm 221 against the vertical stop 227 (see FIG. 21) on the lower guide means 191.

Accordingly, the lower guide means 191 on the second conveyor section 111 is automatically moved out of its board guiding position when the second conveyor section 111 is retracted over the first conveyor section 110 and automatically returned to its board guiding position when the second conveyor section 111 is extended from the first conveyor section 110. Each of the cam means 226, which automatically shifts the position of the lower guide means 191 on one side of the second conveyor section 111 during retraction and extension of the second conveyor section 111, is mounted on a guide element 228' on the rear end of the first conveyor section 110. The guide elements 228' aid in guiding the drywall board 16 during its advancement from the first conveyor section 110 to the second conveyor section 111 by the chain 141 after the drywall board 16 leaves the U-shaped channel 140.

The lower guide means 193 on the third conveyor section 112 has the same construction as the lower guide means 191 on the second conveyor section 111 except that the arm 221 must be longer. This is because of the greater distance between the channels 132 of the third conveyor section 112 than the distance between the channels 122 of the second conveyor section 111.

There also are slides 229 (see FIG. 16) on the second conveyor section 111 to cooperate with the guides 223 of the lower guide means 193 on the third conveyor section 112 in the same manner as the slides 228 function. The second conveyor section 111 has cam means 230 at the rear end of each of the lower channels 122 to cooperate with the lower guide means 193 on the third conveyor section 112 in the same manner as the cam means 226 functions. Each of the cam means 230 is supported on a guide element 231 on the second conveyor section 111. The guide elements 231 aid in guiding the drywall board 16 during its advancement from the second conveyor section 111 to the third conveyor section 112 by the chain 141 after the drywall board 16 leaves the U-shaped channel 155.

While a separate cable and motor may be employed to advance and retract each of the second conveyor section 111 and the third conveyor section 112, the chain 141 also can be employed to provide this extension and retraction through locking the chain 141 against motion. This enables rotation of the chain motor 142 to cause advancement or retraction of the conveyor sections 111 and 112 depending on the direction in which the motor is rotated.

To prevent the chain 141 from moving, a chain lock 240 (see FIGS. 24 and 25) is employed. The chain lock 240 includes a plate 240' having a rack 241, which has its teeth fit between rollers of the chain 141 to prevent motion of the chain 141 when the motor 142 is rotated.

The chain lock 240 is secured to the rear end of the third conveyor section 112 by having a pair of threaded screws 242, which are carried by the plate 240', extending into a pair of nuts 243, which are secured to a plate 244 (see FIG. 26) extending between the two rearmost plates 134 connected to the lower channels 132 of the third conveyor section 112 and fixed thereto.

The chain lock 240 also has a first pair of substantially parallel plates 245 extending upwardly from one end of the plate 240' and a second plate 246 supported adjacent one side of the plate 240'. One of the plates 245 is offset relative to the plate 246 so that the chain lock 240 can be locked against sidewise motion through having the cooperating plates 245 and 246 engaging opposite surfaces of the next to last of the plates 134, which are secured to the third conveyor section 112. The other of the plates 245 also engages the next to last of the plates 134.

It is necessary to remove the chain lock 240 from the third conveyor section 112 by turning handles 248 on the ends of the screws 242 whenever it is desired for the chain 141 to advance the drywall board 16 along the conveyor 63. Thus, the chain lock 240 is employed only during extension or retraction of the conveyor 63.

When the second conveyor section 111 and the third conveyor section 112 are fully extended, it is necessary to prevent retraction of the third conveyor section 112 relative to the second conveyor section 111 and retraction of the second conveyor section 111 relative to the first conveyor section 110 when the third conveyor section 112 is above the second conveyor section 111 as when supplying the drywall boards 16 to the third floor of a building, for example. This is because the conveyor sections would retract because of gravity.

Accordingly, the third conveyor section 112 has a pivot plate 255 (see FIG. 27) pivotally mounted thereon by a bolt 256 extending through a plate 256', which is mounted on one of the plates 160A by having its ends welded thereto with its central portion spaced from the plate 160A to which it is welded, and the parallel plates 160A. The pivot plate 255, which is mounted adjacent the front end of the third conveyor section 112, has a surface 257 for abutting the rear end of the second conveyor section 111 to prevent any retraction by gravity.

The pivot plate 255 is moved between its effective and ineffective positions by a control rod 258, which extends from the pivot plate 255 to the rear end of the third conveyor section 112. Thus, when the conveyor 63 has been extended to the third floor of a building, for example, a person on the third floor of the building can actuate the control rod 258 to position the pivot plate 258 in its effective locking position. A stop 259 is mounted on the plate 256' on the third conveyor section 112 for engaging a surface 260 of the pivot plate 255 to aid in retaining the pivot plate 255 in its locking position in which it prevents retraction of the third conveyor section 112 relative to the second conveyor section 111. Because of the length of the chain 141, there can be no inadvertent retraction of the second conveyor section 111 relative to the first conveyor section 110 when the pivot plate 255 is in its locking position in which the surface 257 abuts the rear end of the second conveyor section 111.

The automatic control of the lifting mechanisms 64 and 65 so that only one of the lifting mechanisms 64 and 65 is positioned to deposit the drywall board 16 supported thereby in the conveyor 63 at any time is through a plurality of limit switches, which are mounted on the H-beams 71 at the front end of the bed 15 and on the suction racks 68 of the lifting mechanisms 64 and 65. Thus, a plurality of the limit switches is mounted on one of the front H-beams 71 for cooperation with activation mechanisms on the front lifting support 66 of one of the lifting mechanisms 64 and 65. A similar arrangement is provided on the other of the front H-beams 71 at the front of the bed 15 for cooperation with the front lifting support 66 of the other of the lifting mechanisms 64 and 65. There also is a single limit switch mounted on the suction rack 68 of each of the lifting mechanisms 64 and 65.

Figure 29:
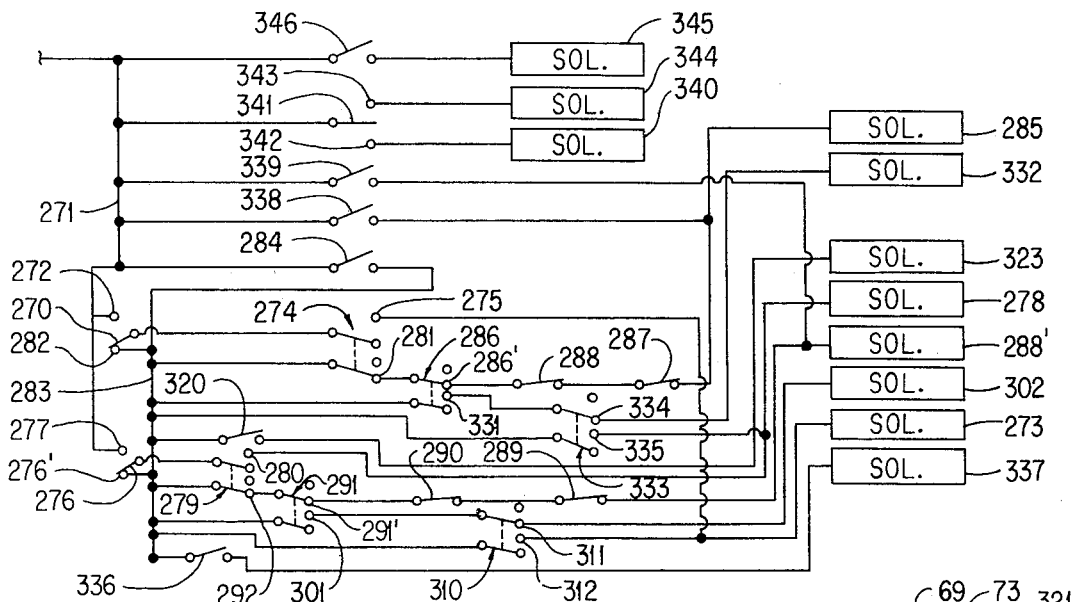
FIG. 29 is a schematic circuit diagram of the control circuits utilized with the article handling apparatus of the present invention.

The positions of the various limit switches when each of the lifting mechanisms 64 and 65 is engaging the tops of one of the two stacks of the drywall boards 16 are shown in the circuit diagram of FIG. 29. In order for the lifting mechanism 65 to reach this position, it is necessary for a manual switch 270, which is connected to a power supply line 271, to have been moved into engagement with a contact 272 to energize a solenoid 273 to move the lifting mechanism 65 downwardly through the motor 96. Prior to the lifting mechanism 65 engaging the top of one of the stacks of the drywall boards 16, a limit switch 274 is engaging a contact 275 to complete the circuit to the solenoid 273 when the switch 270 engages the contact 272.

To move the lifting mechanism 64 downwardly until it engages the top drywall board 16 of one of the stacks, it is necessary to move a manual switch 276, which is resiliently biased into engagement with a contact 276', out of engagement with the contact 276' and into engagement with a contact 277 whereby a solenoid 278 is energized. This causes the motor 95 to move the lifting mechanism 64 downwardly. Prior to the lifting mechanism 64 engaging the top of the other of the two stacks of the drywall boards 16, a limit switch 279, which is mounted on the suction rack 68 of the lifting mechanism 64 as shown in FIG. 6, is engaging a contact 280 to complete the circuit to the solenoid 278 when the switch 276 engages the contact 277.

When the lifting mechanism 65 has been moved into engagement with the top drywall board 16 of one of the stacks by the solenoid 273 being energized because of the manual switch 270 engaging the contact 272, the limit switch 274, which is mounted on the suction rack 68 of the lifting mechanism 65 in the same manner as shown in FIG. 6 for the limit switch 279 on the suction rack 68 of the lifting mechanism 64, is moved out of engagement with the contact 275 and into engagement with a contact 281. When the limit switch 274 is moved away from the contact 275, the solenoid 273 is de-energized irrespective of the manual switch 270 being engaged with the contact 272. Thus, downward motion of the lifting mechanism 65 by the motor 96 is stopped when the limit switch 274 is moved away from the contact 275.

When the manual switch 270 is moved away from the contact 272, it is resiliently biased into engagement with a contact 282, which is connected to a power line 283, but current cannot flow from the power line 283, which is connected to the power line 271 through a master control switch 284, to the solenoid 273 because of the limit switch 274 not engaging the contact 275. Therefore, release of the manual switch 270 cannot cause energization of the solenoid 273 after the lifting mechanism 65 has engaged the top drywall board 16 of one of the stacks. Thus, the solenoid 273 cannot be activated after the lifting mechanism 65 engages the top drywall board 16 of one of the stacks. This insures that further downward movement of the lifting mechanism 65 is prevented.

When the limit switch 274 is moved away from the contact 275 and into engagement with the contact 281, current is supplied to a solenoid 285, which causes upward motion of the lifting mechanism 65, from the power line 283 whenever a limit switch 286 is engaging a contact 286' and normally closed limit switches 287 and 288 are closed. Whenever the solenoid 285 is energized, the lifting mechanism 65 is moved upwardly by the motor 95.

As shown in FIG. 7, the limit switches 286 and 287 are mounted on the front H-beam 71 on which the front lifting support 66 of the lifting mechanism 64 moves. The limit switch 288 is mounted on the front H-beam 71 on which the front lifting support 66 of the lifting mechanism 65 moves.

The automatic upward motion of the lifting mechanism 64 occurs only when a solenoid 288' is energized. This can occur only when normally closed limit switches 289 and 290 are closed, a limit switch 291 is engaging a contact 291', and the limit switch 279 is engaging a contact 292 to connect the solenoid 288' through the limit switches 279 and 289-291 to the power line 283.

The limit switch 279, which is mounted on the suction rack 68 of the lifting mechanism 64 as shown in FIG. 6, engages the contact 292 to energize the solenoid 288', if the limit switches 289-291 are closed, when it engages the top drywall board 16 of one of the stacks on the truck bed 15. Thus, the limit switch 279 is in this position of engaging the contact 292 from the time that it engages the drywall board 16 until the drywall board 16 is released onto the conveyor 63.

As shown in FIG. 7, the limit switch 290 is mounted on the front H-beam 71 on which the front lifting support 66 of the lifting mechanism 64 moves. The limit switches 289 and 291 are mounted on the front H-beam 71 on which the front lifting support 66 of the lifting mechanism 65 moves. Thus, when the limit switch 289 or 291 is opened, upward motion of the lifting mechanism 64 is stopped. This insures that the lifting mechanism 64 cannot move upwardly beyond a predetermined point when the lifting mechanism 65 has moved upwardly past a predetermined point. Upward motion of the lifting mechanism 64 also is stopped when the limit switch 290 is opened. The opening of the limit switch 288 limits the upward movement of the lifting mechanism 65 on the H-beams 71.

The solenoids 273 and 285 have their plungers connected to opposite sides of a valve spool, which is spring biased to its neutral position. The valve spool controls the flow of hydraulic fluid to the motor 96. That is, the fluid flow to the motor 96 is in one direction when the solenoid 273 is energized and in the opposite direction when the solenoid 285 is energized.

Additionally, whenever either the solenoid 273 or 285 is energized, the plunger of the non-energized solenoid 273 or 285 is moved sufficiently with the valve spool so that energization of the solenoid, which has been non-energized, is ineffective as long as the other of the solenoids 273 and 285 is energized because the plunger is not in the field of the solenoid. However, when the energized solenoid becomes de-energized and the other solenoid is energized, then the valve spool is moved in the opposite direction since it initially is moved to its center position by the spring. One suitable example of the valve spool is sold as model No. MD04-SDNC-AD-12VDC by Racine Hydraulics, Racine, Wis.

Accordingly, when the solenoid 273 is de-energized, the valve spool is moved to its neutral position by its spring. If the solenoid 285 is activated at this time, then the valve spool is moved in the opposite direction to enable fluid flow to the motor 96 so that the lifting mechanism 65 is moved upwardly.

Similarly, the solenoids 278 and 288' have their plungers connected to a valve spool, which controls the flow of hydraulic fluid to the motor 95, in the same manner as the solenoids 273 and 285 are connected to the valve spool through their plungers. The same type of operation occurs as discussed for the solenoids 273 and 285.

If the lifting mechanism 65 is initially moved into engagement with the top drywall board 16 of the stack by the switch 270 engaging the contact 272 to energize the solenoid 273, the limit switch 274 engages the contact 281. Since the limit switches 287 and 288 are closed and the limit switch 286 is engaging the contact 286', this causes the solenoid 285 to be activated to cause the lifting mechanism 65 to be raised upwardly. When upward motion of the lifting mechanism 65 starts, the switch 270 is released to return to its resiliently biased position in which it engages the contact 282.

After upward motion of the lifting mechanism 65 begins, the lifting mechanism 64 is moved downwardly into engagement with the top drywall board 16 of the stack with which it cooperates by moving the switch 276 into engagement with the contact 277 to energize the solenoid 278. When the lifting mechanism 64 engages the top drywall board 16, the limit switch 279 engages the contact 292, but this does not cause the solenoid 288' to be activated to cause the lifting mechanism 64 to be raised upwardly because the prior engagement of one of the flats 73 on the front lifting support 66 of the lifting mechanism 65 moved the limit switch 291 out of engagement with the contact 291' and into engagement with a contact 301. When upward motion of the lifting mechanism 64 starts, the switch 276 is released to return to its resiliently biased position in which it engages the contact 276'.

The engagement of the switch 292 with the contact 301 energizes a solenoid 302. The activation of the solenoid 302 causes the motor 86 of the lifting mechanism 65 to rotate the rack 68 counterclockwise (as viewed in FIG. 7) while upward motion of the lifting mechanism 65 is continuing and after upward motion of the lifting mechanism 65 has ceased.

The rotation of the motor 86 of the lifting mechanism 65 continues until an actuator 309 (see FIG. 1) on the rack 68 engages a limit switch 310 (see FIG. 29), which is carried by the vertical tube 90 of the front lifting support 66 of the lifting mechanism 65. When this occurs, the limit switch 310 is moved away from engagement with a contact 311 and into engagement with a contact 312. This de-energizes the solenoid 302 to stop rotary motion of the rack 68 with the drywall board 16 in its vertical position.

The engagement of the switch 310 with the contact 312 energizes the solenoid 273 whereby the lifting mechanism 65 is moved downwardly since the solenoid 285 has been de-energized. The solenoid 285 is de-energized by the normally closed limit switch 288 being engaged by an actuator 315 (see FIGS. 10 and 11), which is carried adjacent the lower end of the longitudinal tubular member 69 of the lifting mechanism 65. This stops the upward motion of the lifting mechanism 65 through the limit switch 288 interrupting the current flow to the solenoid 285, and this occurs prior to the motor 86 ceasing to rotate the rack 68. Thus, because the solenoid 285 is de-energized prior to the solenoid 273 being energized, downward motion of the lifting mechanism 65 begins upon energization of the solenoid 273.

After the lifting mechanism 65 has moved downwardly, a vacuum valve 315' (see FIG. 6), which is in the line supplying the vacuum to the suction cups 79 and supported by the channel 88 (see FIG. 10) of the front lifting support 66, is opened by engaging cam means 316 (see FIG. 15) at the front, upper end of the outer side of the first conveyor section 110. As a result, the drywall board 16 ceases to be firmly held at this time, which is after sufficient downward motion of the lifting mechanism 65 has occurred to dispose the board 16 within the conveyor 63.

When the drywall board 16 is released from the suction cups 79 of the lifting mechanism 65, the limit switch 274 is moved away from the contact 281 and into engagement with the contact 275. Thus, this supplies power to the solenoid 273 to insure continued downward motion of the lifting mechanism 65 until the top drywall board 16 of the stack is again engaged by the limit switch 274. This is because the switch 310 becomes ineffective when the rack 68 is rotated away from the limit switch 310 since the limit switch 310 no longer engages the contact 312 but again engages the contact 311.

The outward motion of the rack 68 is accomplished through a normally open limit switch 320, which is mounted on the front H-beam 71 having the front lifting support 66 of the lifting mechanism 65 mounted thereon, being engaged by an actuator 321 (see FIG. 11) on the lifting mechanism 65 after the limit switch 274 has engaged the contact 275. The actuator 321 has a beveled lower end 322 to move the limit switch 320 to its closed position only on the downward motion of the lifting mechanism 65. The closing of the normally open limit switch 320 energizes a solenoid 323 to cause the motor 86 on the lifting mechanism 65 to rotate in the opposite direction to that in which it rotated during upward motion of the lifting mechanism 65. This produces a clockwise (as viewed in FIG. 7) motion of the rack 68.

The actuator 321 has a relatively long length so that it holds the limit switch 320 closed for a sufficient period of time to enable the rack 68 to return to its vertical position. The rack 68 also is mechanically stopped by the rack 68 engaging the horizontal tube 89 (see FIGS. 10 and 11) on the front lifting support 66 of the lifting mechanism 65.

The upward motion of the lifting mechanism 64 beings when the solenoid 288' is energized. This occurs when the lifting mechanism 65 moves downwardly sufficiently from its uppermost position for the normally closed limit switch 289 to return to its closed position and the limit switch 291 to be moved into engagement with the contact 291'. When the limit switch 291 moves into engagement with the contact 291', the lifting mechanism 64 begins upward motion from the position in which it had been stopped by the initial removal of the limit switch 291 from engagement with the contact 291' due to the upward motion of the lifting mechanism 65. Thus, the lifting mechanism 64 is moving upwardly while the lifting mechanism 65 is moving downwardly.

As the lifting mechanism 64 moves upwardly, one of the flats 73 on the front lifting support 66 of the lifting mechanism 64 engages the limit switch 286, which is disposed in the circuit to the solenoid 285, to cause the limit switch 286 to be moved out of engagement with the contact 286' and into engagement with a contact 331. Therefore, the lifting mechanism 65 cannot be moved upwardly when the limit switch 274 again engages the contact 281 because of the top drywall board 16 of one of the stacks being engaged by the limit switch 274 on the lifting mechanism 65. This is because removal of the limit switch 286 from the contact 286' results in the circuit to the solenoid 285 being opened.

The engagement of the switch 286 with the contact 331 energizes a solenoid 332. The activation of the solenoid 332 causes the motor 86 of the lifting mechanism 64 to rotate the rack 68 clockwise (as viewed in FIG. 7) while upward motion of the lifting mechanism 64 is continuing and after upward motion of the lifting mechanism 64 has ceased.

The rotation of the motor 86 of the lifting mechanism 64 continues until the actuator 309 (see FIG. 1) on the rack 68 engages a limit switch 333 (see FIG. 6), which is carried by the vertical tube 90 of the front lifting support 66 of the lifting mechanism 64. When this occurs, the limit switch 333 is moved away from engagement with a contact 334 (see FIG. 29) and into engagement with a contact 335. This de-energizes the solenoid 332 to stop rotary motion of the rack 68 with the drywall board 16 in its vertical position.

The engagement of the limit switch 333 with the contact 335 energizes the solenoid 278 whereby the lifting mechanism 64 is moved downwardly since the solenoid 288' has been de-energized. The solenoid 288' is de-energized by the normally closed limit switch 290 being opened by the actuator 315 (see FIGS. 10 and 11), which is carried adjacent the lower end of the longitudinal tubular member 69 of the front lifting support 66 of the lifting mechanism 64. This stops the upward motion of the lifting mechanism 64 through the limit switch 290 (see FIG. 29) interrupting the current flow to the solenoid 288', and this occurs prior to the motor 86 ceasing to rotate the rack 68. Thus, because the solenoid 288' is de-energized prior to the solenoid 278 being energized, downward motion of the lifting mechanism 64 begins upon energization of the solenoid 278.

It should be understood that each of the front H-beams 71 has a stop 335' (see FIG. 7) disposed slightly above the limit switches 288 and 290. Thus, the actuator 315 on the front lifting support 66 of each of the lifting mechanisms 64 and 65 not only engages the limit switch 288 or 290 but also engages the stop 335'. This insures that upward motion of the lifting mechanism 64 or 65 is stopped even if the limit switch 288 or 290 should not function properly.

Furthermore, the rear lifting support 67 of each of the lifting mechanisms 64 and 65 has a stop 335A (see FIG. 13) on the longitudinal tubular member 69 for engaging a stop (not shown) on each of the rear H-beams 71 and similarly located as the stop 335' on each of the front H-beams 71. This also aids in insuring that the upward motion of the lifting mechanisms 64 and 65 is stopped even if the limit switch 288 or 290 should not function properly.

After the lifting mechanism 64 has been moved downwardly, the vacuum valve 315' (see FIG. 6), which is in the line supplying the vacuum to the suction cups 79 and supported by the channel 88 of the front lifting support 66, is opened by the cam means 316 (see FIG. 15) at the front, upper end of the outer side of the first conveyor section 110. As a result, the drywall board 16 ceases to be firmly held at this time, which is after sufficient downward motion of the lifting mechanism 64 has occurred to dispose the board 16 within the conveyor 63.

When the drywall board 16 is released from the suction cups 79 of the lifting mechanism 64, the limit switch 279 is moved away from the contact 292 and into engagement with the contact 280. Thus, this supplies power to the solenoid 278 to insure continued downward motion of the lifting mechanism 64 until the top drywall board 16 of the stack is again engaged by the limit switch 279. This is because the limit switch 333 becomes ineffective when the rack 68 is rotated away from the limit switch 333 since the limit switch 333 no longer engages the contact 335 but again engages the contact 334.

The outward (counterclockwise as viewed in FIG. 7) motion of the rack 68 is accomplished through a normally open limit switch 336, which is mounted on the front H-beam 71 having the front lifting support 66 of the lifting mechanism 64 mounted thereon, being engaged by the actuator 321 on the front lifting support 66 of the lifting mechanism 64 after the limit switch 279 has engaged the contact 280. The beveled lower end 322 of the actuator 321 moves the limit switch 336 to its closed position only on the downward motion of the lifting mechanism 64. Closing of the normally open limit switch 336 energizes a solenoid 337 to cause the motor 86 on the lifting mechanism 64 to rotate in the opposite direction to that in which it rotated during upward motion of the lifting mechanism 64. This produces a counterclockwise (as viewed in FIG. 7) motion of the rack 68.

As previously mentioned, the actuator 321 has a relatively long length so that it holds the limit switch 336 closed for a sufficient period of time to enable the rack 68 to return to its vertical position. The rack 68 also is mechanically stopped by the rack 68 engaging the horizontal tube 89 on the front lifting support 66 of the lifting mechanism 64.

After the lifting mechanism 64 moves downwardly sufficiently to enable the normally closed limit switch 287 to return to its closed position and the limit switch 286 to be moved into engagement with the contact 286', the solenoid 285 is energized. This starts upward motion of the lifting mechanism 65 so that there are continuous up and down motions of the lifting mechanisms 64 and 65 in a controlled sequence. The lifting mechanism 64 or 65 cannot move from the top of the stack of the drywall boards 16 until the other lifting mechanism 64 or 65 has started down.

The solenoid 285 is connected to the power supply line 271 through a manual switch 338. Whenever the manual switch 338 is closed, the lifting mechanism 65 is moved upwardly under the control of the operator.

The solenoid 288' is connected to the power supply line 271 through a manual switch 339. Closing of the manual switch 339 energizes the solenoid 288' to cause upward motion of the lifting mechanism 64 under the control of the operator.

The chain motor 142 (see FIG. 18) is driven at a very slow speed to extend the conveyor 63 (see FIG. 1) through energizing a solenoid 340 (see FIG. 29) by moving a manual switch 341 into engagement with a contact 342. The energization of the solenoid 340 causes a valve to be moved to allow hydraulic fluid flow to the chain motor 142 at a desired rate and a desired direction. Thus, the chain motor 142 is driven at a relatively low speed.

When the conveyor 63 is to be retracted, the manual switch 341 is moved into engagement with a contact 343 to energize a solenoid 344 whereby the chain motor 142 is rotated in the opposite direction to when the solenoid 340 is activated and at the same relatively low speed. The energization of the solenoid 344 causes a valve to be moved to allow hydraulic fluid flow to the chain motor 142 at the desired rate and in the desired direction. Of course, the chain lock 240 (see FIGS. 24 and 25) must be effective during extension and retraction.

Whenever the chain motor 142 (see FIG. 18) is to be driven at the speed at which the chain 141 moves the drywall board 16 along the conveyor 63 (see FIG. 1), a solenoid 345 (see FIG. 29) is energized through closing of a manual switch 346. The energization of the solenoid 345 opens a valve to allow supply of hydraulic fluid at a rate to drive the chain motor 142 at a much higher speed than when either the solenoid 340 or 344 is energized.

It should be understood that each of the limit switches 286 and 291 (see FIG. 7) has its portion, which is engaged by the flat 73 (see FIGS. 10 and 11) on the front lifting support 66 of the lifting mechanism 64 or 65, extend through a slot cut in the wall of the H-beam 71 (see FIG. 7) on which the limit switch 286 or 291 is mounted. The actuating portion of each of the limit switches 290 and 288 is mounted so that it can be engaged only by the actuator 315 (see FIGS. 10 and 11) on the front lifting support 66 of the lifting mechanism 64 or 65. The actuating portion of each of the limit switches 336 and 320 (see FIG. 7) is located forward of the actuating portion of the limit switch 290 and 288, respectively, so that it can be engaged only by the actuator 321 (see FIGS. 10 and 11) on the front lifting support 66 of the lifting mechanism 64 or 65.

It should be understood that the front lifting support 66 of each of the lifting mechanims 64 and 65 has a bottom stop 351 (see FIG. 11) thereon for engaging a stop 352 (see FIG. 7) on the adjacent of the front H-beams 71. Likewise, the rear lifting support 67 of each of the lifting mechanisms 64 and 65 has a bottom stop 353 (see FIG. 13) for engaging a stop 354 (see FIG. 5) on the adjacent of the rear H-beams 71. The bottom stops 351 and 353 insure that downward motion of the lifting mechanism 64 or 65 is stopped even if the limit switch 274 or 279 should not function properly.

Figure 10:
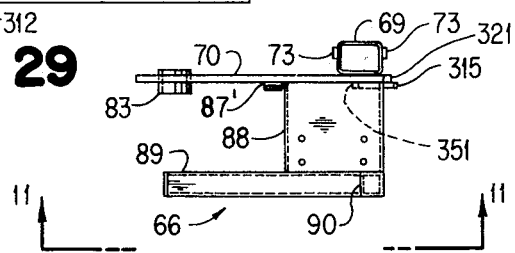
FIG. 10 is a top plan view of a front lifting support of the lifting mechanisms of the article handling apparatus of the present invention.
Figure 11:
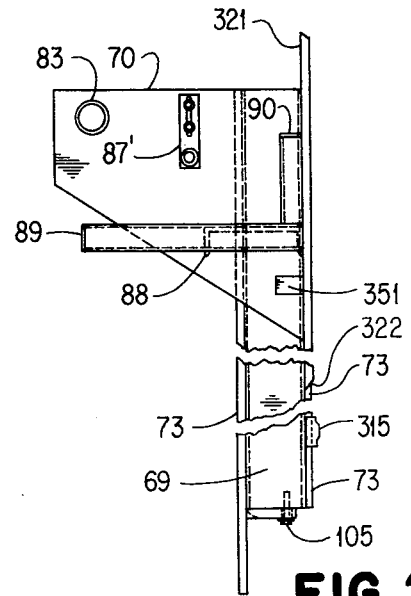
FIG. 11 is a rear elevational view of the front lifting support of FIG. 10 and taken along line 11—11 of FIG. 10.

The stops 352 and 354 are L-shaped so that the portion, which is not secured to the H-beam 71 and is engaged by the stop 351 or 353, is horizontally spaced from the H-beam 71 so that the arm 70 of the front lifting support 66 and the arm 70' of the rear lifting support 67 do not contact the stops 352 and 354, respectively, during movement of the lifting mechanisms 64 and 65. Thus, as shown in FIG. 10, the bottom stop 351 of the front lifting support 66 is in back of the arm 70 to insure that it engages the bottom stop 352. As shown in FIG. 12, the bottom stop 353 of the rear lifting support 67 is in front of the arm 70' to insure that it engages the bottom stop 354.

Considerably the operation of the article handling apparatus of the present invention, the drywall boards 16 (see FIG. 1) are deposited on the truck bed 15 for transport by the truck 10 to the construction site. While there is only one of the boards 16 shown on the truck bed 15 in each of the two stacks, it should be understood that there would be a plurality of the drywall boards 16 thereon at the start with an equal number in each stack.

Upon arrival at the construction site, the truck 10 is positioned as close to the building as possible. However, it usually remains on a paved street.

It may be necessary to raise the front end of the truck bed 15 relative to the chassis or frame 11 of the truck 10 or raise the rear end of the chassis or frame 11 relative to the front of the truck 10 to have the extensible conveyor 63 properly aligned with the opening in the building through which the drywall boards 16 are to be advanced. The conveyor 63 is supported in fixed relation to the truck bed 15 so that any relative movement of the truck bed 15 or the chassis or frame 11 produces the same movement of the conveyor 63.

For example, if the drywell boards 16 are to be supplied to a second floor, then it is necessary to raise the rear end of the frame or chassis 11 relative to the front of the truck 10. This is accomplished through applying hydraulic fluid to the cylinders 46. This causes the feet 53 of the stabilizers 50 to initially engage the street. Then, the rear end of the chassis or frame 11 is lifted with respect to the front of the truck 10.

If it is necessary for the conveyor 63 to have its front end raised with respect to its rear end because of the location of the building relative to the street whereby the building would be lower than the street, for example, then hydraulic fluid is supplied to the hydraulic cylinders 30 to raise the front end of the bed 15 with respect to its back end through pivoting about the axis of the pins 27.

If the street should not be level, then it may be necessary to selectively activate the cylinders 30 and 46 to position the conveyor 63 at the desired angle. Thus, each of the cylinders 30 and each of the cylinders 46 may be selectively activated.

With the conveyor 63 at the desired angle, hydraulic fluid is supplied to the hydraulic chain motor 142 (see FIG. 18) through moving the manual switch 341 (see FIG. 29) into engagement with the contact 342 to energize the solenoid 340. This positions a valve to control the rate and direction of hydraulic fluid flow to the chain motor 142 (see FIG. 29) to cause it to be driven at a very slow speed in a direction to extend the conveyor sections 111 (see FIG. 16) and 112 (see FIG. 17) when the chain lock 240 is secured to the rear end of the third conveyor section 112.

When the conveyor sections 111 (see FIG. 16) and 112 (see FIG. 17) have been fully extended, the manual switch 341 is removed from engagement with the conact 342 to de-energize the solenoid 340 to stop the chain motor 142 (see FIG. 18) and the chain lock 240 (see FIGS. 24 and 25) is removed. Then, the pivot plate 255 is pivoted to its effective position of FIG. 27 by the control rod 258. In this position, the pivot plate 255 prevents any retraction of the third conveyor section 112 relative to the second conveyor section 111 by gravity.

The manual switch 270 (see FIG. 29) is then moved into engagement with the contact 272 to energize the solenoid 273 to cause movement of the lifting mechanism 65 downwardly. When the lifting mechanism 65 engages the top drywall board 16, the limit switch 274 is moved out of engagement with the contact 275 to de-energize the solenoid 273 to stop downward motion of the lifting mechanism 65 (see FIG. 5) by the hydraulic motor 96 even if the manual switch 270 (see FIG. 29) is held in engagement with the contact 272. Accordingly, upward motion of the lifting mechanism 65 (see FIG. 5) occurs because of the limit switch 274 (see FIG. 29) engaging the contact 281 to enable energization of the solenoid 285 whereby the motor 96 (see FIG. 5) is rotated in a direction to move the lifting mechanism 65 upwardly.

After the lifting mechanism 65 starts upwardly, the manual switch 276 (see FIG. 29) is moved into engagement with the contact 277 to energize the solenoid 278 to produce downward movement of the lifting mechanism 64 (see FIG. 6). When the limit switch 279 on the suction rack 68 of the lifting mechanism 64 engages the top drywall board 16 of the other of the two stacks of the drywall boards 16, the limit switch 279 is moved out of engagement with the contact 280 (see FIG. 29) to de-energize the solenoid 278 and stop downward motion of the lifting mechanism 64. However, the movement of the limit switch 279 into engagement with the contact 292 does not energize the solenoid 288' to cause upward motion of the lifting mechanism 64 (see FIG. 1) by the hydraulic motor 95 because of the limit switch 291 (see FIG. 29) ceasing to engage the contact 291' due to the switch engaging flat 73 (see FIG. 10) on the front lifting support 66 of the lifting mechanism 65 engaging the limit switch 291 (see FIGS. 7 and 29).

When the limit switch 291 engages the contact 301 to energize the solenoid 302 to rotate the rack 68, the upward movement of the lifting mechanism 65 continues for part of the time that the rack 68 is being rotated to move the drywall board 16 from its horizontal position to its vertical position for disposition between the guides 139 (see FIGS. 14 and 15) on the first conveyor section 110. The guides 139 are angled toward each other to insure that the drywall board 16 falls onto the chain 141, (see FIG. 18) which is being driven by the chain motor 142. The chain motor 142 has been energized by closing of the switch 346 (see FIG. 29) to energize the solenoid 345 to position a valve to control the rate of hydraulic fluid flow to the motor 142 (see FIG. 18) to cause it to be driven at a faster speed than when extending the conveyor sections 111 (see FIG. 16) and 112 (see FIG. 17).

The rotary motion of the rack 68 is stopped by the limit switch 310 (see FIG. 29) being engaged by the actuator 309 (see FIG. 1) on the rack 68. This occurs after stopping of upward motion of the lifting mechanism 65 by the actuator 315 (see FIG. 10) on the front lifting support 66 of the lifting mechanism 65 engaging the limit switch 288 (see FIG. 29) to de-energize the solenoid 285. The engagement of the actuator 309 (see FIG. 1) with the limit switch 310 (see FIG. 29) moves the limit switch 310 into engagement with the contact 312 to energize the solenoid 273 to cause the lifting mechanism 65 to start downwardly.

The suction in the suction cups 79 (see FIG. 1) is released after sufficient downward motion of the lifting mechanism 65 has occurred to dispose the drywall board 16 within the conveyor 63. This allows the drywall board 16 to start to fall through the guides 139 (see FIG. 14) onto the chain 141 (See FIG. 18). This is accomplished by the vacuum valve 315' (see FIG. 6) being opened by the vacuum valve 315' engaging the cam means 316 (see FIG. 1) on the first conveyor section 110 during downward movement of the lifting mechanism 65.

The release of the drywall board 16 from the suction cups 79 of the lifting mechanism 65 causes the limit switch 274 (see FIG. 29) to move away from the contact 281 and be biased into engagement with the contact 275. This insures that the solenoid 285 remains de-energized since the limit switch 288 closes when the lifting mechanism 65 moves downwardly and insures that the solenoid 273 remains energized to cause downward motion of the lifting mechanism 65 to continue since the limit switch 310 ceases to engage the contact 312 when rotary motion of the rack 68 in the opposite direction begins.

The rack 68 on the lifting mechanism 65 is rotated in the opposite direction during downward motion of the lifting mechanism 65 because of the actuator 321 (see FIG. 11) closing the limit switch 320 (see FIG. 29) to energize the solenoid 323. This insures that the suction cups 79 (see FIG. 1) are again positioned to pick up one of the horizontally disposed drywall boards 16 on the truck bed 15. The limit switch 320 (see FIG. 29) is closed after the drywall board 16 is released due to the vacuum valve 315' (see FIG. 6) engaging the cam means 316 (see FIG. 1) prior to the actuator 321 (see FIG. 11) engaging the limit switch 320 (see FIG. 29).

The upward motion of the lifting mechanism 64 begins when the solenoid 288' is energized. This occurs when the lifting mechanism 65 is moved downwardly sufficiently for the normally closed limit switch 289 to return to its closed position and the limit switch 291 to engage the contact 291'.

When the limit switch 286 is moved out of engagement with the contact 286' and into engagement with the contact 331 by the switch engaging flat 73 (see FIG. 10) on the front lifting support 66 of the lifting mechanism 64 engaging the limit switch 286 (see FIG. 29) during upward motion of the lifting mechanism 64, the solenoid 332 is energized to rotate the rack 68 on the lifting mechanism 64. The upward motion of the lifting mechanism 64 continues for part of the time that the rack 68 on the lifting mechanism 64 is rotated to position the drywall board 16, which is supported by the lifting mechanism 64, in the vertical position for disposition through the longitudinal guides 139 (see FIG. 14) on the first conveyor section 110 onto the chain 141 (see FIG. 18).

The rotary motion of the rack 68 (see FIG. 6) of the lifting mechanism 64 is stopped by the limit switch 333 being engaged by the actuator 309 (see FIG. 1) on the rack 68 of the lifting mechanism 64. This occurs after stopping of upward motion of the lifting mechanism 64 by the actuator 315 (see FIG. 11) on the front lifting support 66 of the lifting mechanism 64 engaging the limit switch 290 (see FIG. 29) to de-energize the solenoid 288'. The engagement of the actuator 309 (see FIG. 1) with the limit switch 333 (see FIG. 29) moves the limit switch 333 into engagement with the contact 335 to energize the solenoid 278 to cause the lifting mechanism 64 to start downwardly.

The suction in the suction cups 79 (see FIG. 1) is released after sufficient downward motion of the lifting mechanism 64 has occurred to dispose the drywall board 16 within the conveyor 63. This allows the drywall board 16 to start to fall through the guides 139 onto the chain 141 (see FIG. 18). This is accomplished by the vacuum valve 315' (see FIG. 6) being opened by the vacuum valve 315' engaging the cam means 316 (see FIG. 1) on the first conveyor section 110 during downward movement of the lifting mechanism 64.

The release of the drywall board 16 from the suction cups 79 of the lifting mechanism 65 causes the limit switch 279 (see FIG. 29) to move away from the contact 292 and be biased into engagement with the contact 280. This insures that the solenoid 288' remains de-energized since the limit switch 290 closes when the lifting mechanism 64 moves downwardly and insures that the solenoid 278 remains energized to cause downward motion of the lifting mechanism 64 to continue since the limit switch 333 ceases to engage the contact 335 when rotary motion of the rack 68 in the opposite direction begins.

The rack 68 on the lifting mechanism 64 is rotated in the opposite direction during downward motion of the lifting mechanism 64 because of the actuator 321 (see FIG. 11) closing the limit switch 336 (see FIG. 29) to energize the solenoid 337. This insures that the suction cups 79 (see FIG. 1) are again positioned to pick up one of the horizontally disposed drywall boards 16 on the truck bed 15. The limit switch 336 (see FIG. 6) is closed after the drywall board 16 is released due to the vacuum valve 315' engaging the cam means 316 (see FIG. 1) prior to the actuator 321 (see FIG. 11) engaging the limit switch 336 (see FIG. 29).

The upward motion of the lifting mechanism 65 again begins when the solenoid 285 is energized. This occurs when the lifting mechanism 64 is moved downwardly sufficiently for the normally closed limit switch 287 to return to its closed position and the limit switch 286 to engage the contact 286'. This up and down motion of each of the lifting mechanisms 64 and 65 continues until there are no more of the boards 16 to be deposited in the conveyor 63.

Figure 16:
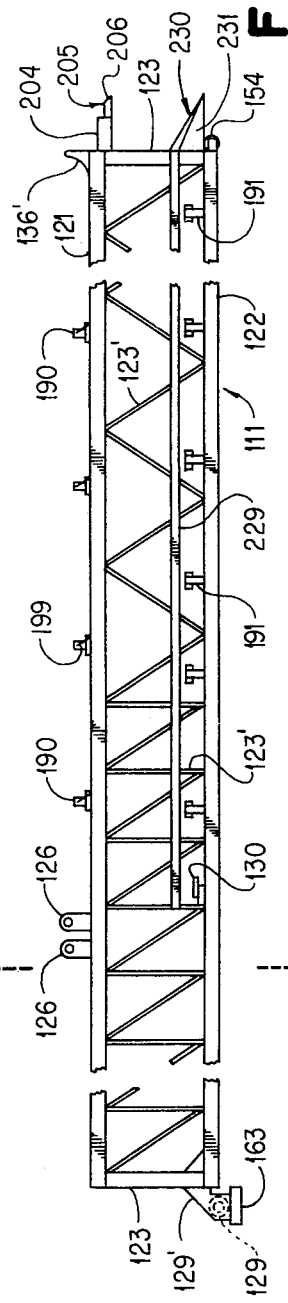
FIG. 16 is a fragmentary side elevational view of a second or intermediate conveyor section of an extensible conveyor of the article handling apparatus of the present invention and supported for sliding movement along the first conveyor section of FIG. 15.
Figure 17:
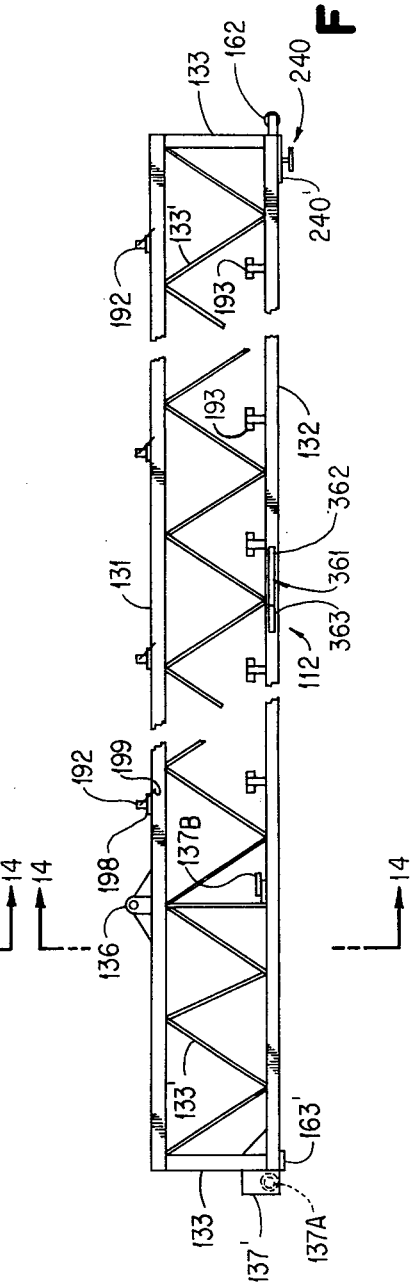
FIG. 17 is a fragmentary side elevational view of a third or rear conveyor section of the article handling apparatus of the present invention and supported for sliding movement along the second conveyor section of FIG. 16.

As each of the boards 16 is deposited on the chain 141 (see FIG. 18), it is advanced through the U-shaped channel 140 (see FIG. 14) to the U-shaped channel 155 on the second conveyor section 111 and guided by the guide means 228' (see FIG. 15) during its movement from the first conveyor section 110 to the second conveyor section 111 (see FIG. 16). The board 16 is moved by the chain 141 (see FIG. 18) along the U-shaped channel 155 (see FIG. 14). The board 16 is guided by the upper guide means 190 (see FIG. 16) and the lower guide means 191 during its movement along the second conveyor section 111.

During its advancement from the second conveyor section 111 to the third conveyor section 112 (see FIG. 17), the board 16 is guided by the guide elements 231 (see FIG. 16). The board 16 remains supported on the chain 141 (see FIG. 18) during this movement from the second conveyor section 111 (see FIG. 16) to the third conveyor section 112 (see FIG. 17).

The board 16 then moves along the third conveyor section 112 where it is guided by the upper guide means 192 and the lower guide means 193. The bottom of the board 16 is disposed on the portion of the chain 141 (see FIG. 18) within the U-shaped channel 162' (see FIG. 14) during its movement along the third conveyor section 112.

The board 16 is then removed from the third conveyor section 112 by a worker within the building. The chain 141 (see FIG. 18) will advance the board 16 sufficiently from the third conveyor section 112 (see FIG. 14) so that the worker does not have to lean out of a building window, for example, to receive the board 16.

When there are no more of the boards 16 to be deposited in the conveyor 63 (see FIG. 1), the master switch 284 (see FIG. 29) is opened to stop all movement of the lifting mechanisms 64 and 65. The lifting mechanisms 64 and 65 are then moved by the manual switches 272 and 276 so that they rest on the truck bed 15.

Then, the manual switch 346 is opened to de-energize the solenoid 345. This stops the drive of the chain motor 142 (see FIG. 18) at the higher speed.

After the chain lock 240 (see FIGS. 24 and 25) is mounted on the third conveyor section 112 (see FIG. 17) and the pivot plate 255 (see FIG. 27) is moved to its ineffective position, the manual switch 341 (see FIG. 29) is moved into engagement with the contact 343 to energize the solenoid 344. This causes the chain motor 142 (see FIG. 18) to be driven in a direction to retract the third conveyor section 112 (see FIG. 14) onto the second conveyor section 111 and the second conveyor section 111 onto the first conveyor section 110 at a relatively slow speed.

Then, the truck bed 15 (see FIG. 1) is returned to its horizontal position, if it has been raised, by activation of the cylinders 30. Similarly, the cylinders 46 have hydraulic fluid supplied thereto to remove the feet 53 of the stabilizers 50 from engagement with the ground so that the chassis or frame 11 is no longer tilted. Then, the truck 10 can be returned to pick up another load of the drywall boards 16.

It should be understood that the retraction of the second conveyor section 111 (see FIG. 16) onto the first conveyor section 110 (see FIG. 15) is stopped by engagement of the roller 129 (see FIG. 16) on the second conveyor section 111 with a stop 360 (see FIGS. 1 and 15) projecting downwardly from the bottom surface of the lower channel 114 of the first conveyor section 110. This insures that the front lifting support 66 (see FIG. 11) of each of the lifting mechanisms 64 and 65 can move upwardly sufficiently to position the board 16 in its vertical position. This also insures that the guide elements 231 (see FIG. 16) on the second conveyor section 111 do not engage the guide elements 228' (see FIG. 15) on the first conveyor section 110 to damage them.

The retraction of the third conveyor section 112 (see FIG. 17) onto the second conveyor section 111 (see FIG. 16) is stopped by the rollers 137A (see FIG. 17) on the third conveyor section 112 engaging the bracket 129' (see FIG. 16) on the second conveyor section 111. This insures that the front end of the third conveyor section 112 is not forward of the front end of the second conveyor section 111.

To prevent the shaking of the conveyor sections 111 and 112 in their retracted position during travel of the truck 10, the outer surface of each of the lower channels 132 (see FIG. 17) of the third conveyor section 112 has a wedging member 361 for engaging the adjacent H-beam 71, which is adjacent the rear end of the truck bed 15. The wedging member 361 has a straight rear surface 362, which is parallel to the outer surface of the lower channel 132, and an inclined front surface 363. The inclined front surfaces 363 function as cams or wedges to guide the third conveyor section 112 so that the surfaces 362 are engaging the adjacent H-beams 71.

It should be understood that the spring 81E (see FIGS. 8 and 8A) aids in removing the drywall board 16 from the suction cups 79. That is, when the suction is released, the force of the spring 81E aids in pushing the drywall board 16 away from the suction cups 79.

An advantage of this invention is that bulky articles such as drywall boards, for example, can be mechanically moved to a relatively inaccessible location. Another advantage of this invention is that it substantially reduces the cost for disposing drywall boards within a house or other building under construction at a construction site.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. An article handling apparatus including:
   support means for supporting articles to be handled in a substantially horizontal position;
   conveying means disposed in vertically spaced relation to said support means;
   means to lift an article from said support means for disposition on said conveying means, said lifting means being supported by said support means;
   said lifting means including disposing means to dispose the article in a substantially vertical position prior to being disposed on said conveying means;
   said lifting means including:
     first lifting means disposed on one side of said conveying means to lift articles from a first stack on said support means;
     second lifting means disposed on the other side of said conveying means to lift articles from a second stack on said support means;
     and said first lifting means and said second lifting means being movable separately;
     and control means to control the separate movement of each of said first lifting means and said second lifting means so that said disposing means of only one of said first lifting means and said second lifting means is effective to dispose one of the articles on said conveying means at any time.

2. The apparatus according to claim 1 in which said control means includes means to prevent upward motion of one of said first and second lifting means until after said disposing means of the other of said first and second lifting means has disposed the article on said conveying means.

3. The apparatus according to claim 1 in which each of said disposing means of said first and second lifting means disposes each of the articles on the same portion of said conveying means in sequence.

4. An article handling apparatus including:
   support means for supporting articles to be handled in a substantially horizontal position;
   conveying means disposed in vertically spaced relation to said support means;
   means to lift an article from said support means for disposition on said conveying means, said lifting means being supported by said support means;
   said lifting means including:
     first lifting means disposed on one side of said conveying means to lift articles from a first stack on said support means;
     and second lifting means disposed on the other side of said conveying means to lift articles from a second stack on said support means;
     each of said first lifting means and said second lifting means including:
       front vertically movable means;
       rear vertically movable means;
       article pick-up means connected to said front vertically movable means and said rear vertically movable means for vertical movement therewith;
       said article pick-up means including means to grasp the article to be lifted;
       rotating means to rotate said article pick-up means relative to said front vertically movable means and said rear vertically movable means during vertical movement to dispose the article being lifted in a substantially vertical position prior to the article being disposed on said conveying means;
       and means to render said grasping means ineffective after said article pick-up means has been moved to dispose the article in the substantially vertical position;
     and control means to control said first lifting means and said second lifting means so that said article pick-up means of only one of said first lifting means and said second lifting means is effective to dispose one of the articles on said conveying means at any time.

5. The apparatus according to claim 4 including: said conveying means comprising:
   a first section fixed to said support means;
   and a plurality of telescoping sections supported for telescoping relation relative to said first section;
   and means to extend and retract each of said telescoping sections.

6. The apparatus according to claim 5 in which:
   said first section of said conveying means receives the article from each of said first and second lifting means in sequence;
   and means to continuously advance the article from said first section along said telescoping sections to the end of said conveying means.

7. The apparatus according to claim 6 in which: said support means includes:
   a truck;
   and said truck having means to support the articles to be handled in a substantially horizontal position;
   said conveying means is disposed above said support means of said truck;
   and means to change the angle relation of said conveying means to the ground on which said truck is supported.

8. The apparatus according to claim 6 in which said control means includes means to prevent upward motion of one of said first and second lifting means until after said disposing means of the other of said first and second lifting means has disposed the article on said conveying means.

9. The apparatus according to claim 4 in which:
   said conveying means is disposed above said support means;
   said article pick-up means is moved upwardly after said grasping means of said article pick-up means has grasped the article to be lifted;
   and said rendering means includes means to cause release of the article during downward movement of said article pick-up means after upward movement of said article pick-up means has been completed whereby the article falls by gravity to said conveying means.

10. The apparatus according to claim 9 in which:
    said grasping means includes means to apply a vacuum to the article to grasp the article to be lifted;
    and said causing means of said rendering means causes release of the vacuum applied by said vacuum applying means.

11. An article handling apparatus including:
    a truck;
    said truck including:

a frame;
means to support articles to be handled in a substantially horizontal position;
and means to pivotally connect one end of said support means of said truck to said frame;
conveying means disposed in vertically spaced relation to said support means of said truck;
said conveying means being supported by said frame above said support means of said truck;
means to lift an article from said support means of said truck for disposition on said conveying means, said lifting means being supported by said support means of said truck;
said lifting means including disposing means to dispose the article in a substantially vertical position prior to being disposed on said conveying means;
and means to change the angle relation of said conveying means to the ground on which said truck is supported;
said changing means including:
 means to cause the other end of said support means of said truck to pivot about said pivot means to raise the other end of said support means of said truck with respect to the one end of said support means of said truck;
 and means to lift the end of said frame having said support means of said true pivotally connected thereto to raise the one end of said support means of said truck with respect to the other end of said support means of said truck.

12. An article handling apparatus including:
support means for supporting articles to be handled in a substantially horizontal position;
conveying means disposed in vertically spaced relation to said support means;
means to lift an article from said support means for disposition on said conveying means, said lifting means being supported by said support means;
said lifting means including vertically movable means to lift the article from said support means;
said lifting means including disposing means to dispose the article in a substantially vertical position prior to being disposed on said conveying means;
said disposing means being vertically movable with said vertically movable means;
said conveying means being disposed above said support means;
and said disposing means disposing the article in a substantially vertical position above said conveying means prior to disposing the article in the substantially vertical position on said conveying means.

13. An article handling apparatus including:
support means for supporting articles to be handled in a substantially horizontal position;
conveying means disposed in vertically spaced relation to said support means;
means to lift an article from said support means for disposition on said conveying means;
said lifting means including:
 first lifting means disposed on one side of said conveying means to lift articles from a first stack on said support means;
 and second lifting means disposed on the other side of said conveying means to lift articles from a second stack on said support means;
and each of said first lifting means and said second lifting means including:
 front vertically movable means;
 rear vertically movable means;
 article pick-up means connected to said front vertically movable means and said rear vertically movable means for vertical movement therewith;
 said article pick-up means including means to grasp the article to be lifted;
 rotating means to rotate said article pick-up means relative to said front vertically movable means and said rear vertically movable means during vertical movement to dispose the article being lifted in a substantially vertical position prior to the article being disposed on said conveying means;
 and means to render said grasping means ineffective after said article pick-up means has been moved to dispose the article in the substantially vertical position.

14. The apparatus according to claim 13 in which:
said conveying means is disposed above said support means;
said article pick-up means is moved upwardly after said grasping means of said article pick-up means has grasped the article to be lifted;
and said rendering means includes means to cause release of the article during downward movement of said article pick-up means after upward movement of said article pick-up means has been completed whereby the article falls by gravity to said conveying means.

15. The apparatus according to claim 14 in which:
said grasping means includes means to apply a vacuum to the article to grasp the article to be lifted;
and said causing means of said rendering means causes release of the vacuum applied by said vacuum applying means.

16. An article handling apparatus including:
support means for supporting articles to be handled in a substantially horizontal position;
conveying means disposed in vertically spaced relation to said support means;
means to lift an article from said support means for disposition on said conveying means, said lifting means supported by said support means;
said lifting means including disposing means to dispose the article in a substantially vertical position prior to being disposed on said conveying means;
said conveying means being disposed above said support means;
and said lifting means including:
 vertically movable means movable in an up and down, non-pivotal reciprocation in a substantially vertical plane;
 said disposing means including article pick-up means connected to said vertically movable means for vertical movement therewith, said article pick-up means grasping the article to be lifted;
 rotating means to rotate said article pick-up means relative to said vertically movable means during vertical movement to dispose the article being lifted in a substantially vertical position above said conveying means during upward movement and prior to the article being disposed on said conveying means;
 and means to cause release of the article from said article pick-up means only after said article pick-up means has been moved to dispose the article in a substantially vertical position and said vertically movable means has begun downward movement to return to the position in which another of the articles to be lifted can be grasped by said article pick-up means.

17. An article handling apparatus including:
support means for supporting articles to be handled in a substantially horizontal position;
conveying means disposed in vertically spaced relation to said support means;
means to lift an article from said support means for disposition on said conveying means, said lifting means being supported by said support means;
said lifting means including disposing means to dispose the article in a substantially vertical position prior to being disposed on said conveying means;
said lifting means including:
first lifting means disposed on one side of said conveying means to lift articles from a first stack on said support means;
and second lifting means disposed on the other side of said conveying means to lift articles from a second stack on said support means;
and each of said first lifting means and said second lifting means including:
vertically movable means movable in an up and down, non-pivotal reciprocation in a substantially vertical plane;
said disposing means including article pick-up means connected to said vertically movable means for vertical movement therewith, said article pick-up means grasping the article to be lifted;
rotating means to rotate said article pick-up means relative to said vertically movable means during vertical movement to dispose the article being lifted in a substantially vertical position prior to the article being disposed on said conveying means;
and means to cause release of the article from said article pick-up means only after said article pick-up means has been moved to dispose the article in a substantially vertical position and said vertically movable means has begun movement to return to the position in which another of the articles to be lifted can be grasped by said article pick-up means.

18. The apparatus according to claim 17 including control means to prevent rotation of said rotating means of one of said first and second lift means until after completion of rotation of said rotating means of the other of said first and second lifting means to dispose the article in the substantially vertical position.

19. An article handling apparatus including:
support means for supporting articles to be handled in a substantially horizontal position;
conveying means disposed in vertically spaced relation to said support means;
means to lift an article from said support means for disposition on said conveying means, said lifting means being supported by said support means;
said lifting means including disposing means to dispose the article in a substantially vertical position prior to being disposed on said conveying means;
and said lifting means including:
vertically movable means movable in an up and down, non-pivotal reciprocation in a substantially vertical plane;
said disposing means including article pick-up means connected to said vertically movable means for vertical movement therewith, said article pick-up means grasping the article to be lifted;
rotating means to rotate said article pick-up means relative to said vertically movable means during vertical movement to dispose the article being lifted in a substantially vertical position prior to the article being disposed on said conveying means;
and means to cause release of the article from said article pick-up means only after said article pick-up means has been moved to dispose the article in a substantially vertical position and said vertically movable means has begun movement to return to the position in which another of the articles to be lifted can be grasped by said article pick-up means.

20. An article handling apparatus including:
support means for supporting articles to be handled in a substantially horizontal position;
conveying means disposed in vertically spaced relation to said support means;
means to lift an article from said support means for disposition on said conveying means, said lifting means being supported by said support means;
said lifting means including disposing means to dispose the article in a substantially vertical position prior to being disposed on said conveying means;
said conveying means comprising:
a first section fixed to said support means;
and a plurality of telescoping sections supported for telescoping relation relative to said first section;
and means to extend and retract each of said telescoping sections.

21. An article handling apparatus including:
support means for supporting articles to be handled in a substantially horizontal position;
conveying means disposed in vertically spaced relation to said support means;
means to lift an article from said support means for disposition on said conveying means, said lifting means being supported by said support means;
said lifting means including disposing means to dispose the article in a substantially vertical position prior to being disposed on said conveying means;
said lifting means including vertically movable means to lift the article from said support means;
said disposing means being vertically movable with said vertically movable means;
said conveying means being disposed above said support means;
means to prevent downward movement of said vertically movable means of said lifting means until said disposing means has disposed the article in the substantially vertical position;
and means to cause release of the article from said disposing means only after said disposing means has disposed the article in the substantially vertical position and said vertically movable means has begun downward movement to return to the position in which another of the articles can be lifted.

* * * * *

UNITED STATES PATENT OFFICE
CERTIFICATE OF CORRECTION

Patent No. 4,113,117          Dated September 12, 1978

Inventor(s) Waymon Joe Douglas et al

It is certified that error appears in the above-identified patent and that said Letters Patent are hereby corrected as shown below:

Column 4, line 47, "ae" should read -- are --.

Column 8, line 57, "function" should read -- functions --.

Column 9, line 25, "pate" should read -- plate --.

Column 10, line 36, "14" (first occurrence) should read -- 114 --.

Column 10, line 54, "channel" should read -- channels --.

Column 12, line 57, " 163' " should read -- 163 --.

Column 14, line 7, "suppot" should read -- support --.

Column 14, line 35, "121" should read -- 211 --.

Column 20, line 48, "ings" should read -- gins --.

Column 24, line 47, "nact" should read --ntact --.

UNITED STATES PATENT OFFICE
CERTIFICATE OF CORRECTION

Patent No. 4,113,117          Dated September 12, 1978

Inventor(s) Waymon Joe Douglas et al

It is certified that error appears in the above-identified patent and that said Letters Patent are hereby corrected as shown below:

Column 30, cancel lines 18 to 24 and substitute:

5. The apparatus according to claim 4 including:

said conveying means comprising:

a first section fixed to said support means;

and a plurality of telescoping sections supported for telescoping relation relative to said first section;

and means to extend and retract each of said telescoping sections.

UNITED STATES PATENT OFFICE
CERTIFICATE OF CORRECTION

Patent No. 4,113,117  Dated September 12, 1978

Inventor(s) Waymon Joe Douglas et al

It is certified that error appears in the above-identified patent and that said Letters Patent are hereby corrected as shown below:

Column 30, cancel lines 32 to 41 and substitute:

7. The apparatus according to claim 6 in which:

said support means includes:

a truck;

and said truck having means to support the articles to be handled in a substantially horizontal position;

said conveying means is disposed above said support means of said truck;

and means to change the angle relation of said conveying means to the ground on which said truck is supported.

UNITED STATES PATENT OFFICE
CERTIFICATE OF CORRECTION

Patent No. 4,113,117   Dated September 12, 1978

Inventor(s) Waymon Joe Douglas et al

It is certified that error appears in the above-identified patent and that said Letters Patent are hereby corrected as shown below:

Column 30, cancel lines 66 to 68 and substitute:

11. An article handling apparatus including:

a truck;

said truck including:

a frame;

means to support articles to be handled in a substantially horizontal position;

and means to pivotally connect one end of said support means of said truck to said frame;

conveying means disposed in vertically spaced relation to said support means of said truck;

said conveying means being supported by said frame above said support means of said truck;

means to lift an article from said support means of said truck for disposition on said conveying means, said lifting means being supported by said support means of said truck;

UNITED STATES PATENT OFFICE
CERTIFICATE OF CORRECTION

Patent No. 4,113,117          Dated September 12, 1978

Inventor(s) Waymon Joe Douglas et al

It is certified that error appears in the above-identified patent and that said Letters Patent are hereby corrected as shown below:

said lifting means including disposing means to dispose the article in a substantially vertical position prior to being disposed on said conveying means;

and means to change the angle relation of said conveying means to the ground on which said truck is supported;

said changing means including:

means to cause the other end of said support means of said truck to pivot about said pivot means to raise the other end of said support means of said truck with respect to the one end of said support means of said truck;

and means to lift the end of said frame having said support means of said truck pivotally connected thereto to raise the one end of said support means of said truck with respect to the other end of said support means of said truck.

UNITED STATES PATENT OFFICE

CERTIFICATE OF CORRECTION

Patent No. 4,113,117   Dated September 12, 1978

Inventor(s) Waymon Joe Douglas et al

It is certified that error appears in the above-identified patent and that said Letters Patent are hereby corrected as shown below:

Column 31, cancel lines 1 to 30.

Column 32, line 45, before "supported" insert -- being --.

Signed and Sealed this

Sixteenth Day of January 1979

[SEAL]

Attest:

RUTH C. MASON
*Attesting Officer*

DONALD W. BANNER
*Commissioner of Patents and Trademarks*